United States Patent
Jain et al.

(10) Patent No.: US 7,490,093 B2
(45) Date of Patent: *Feb. 10, 2009

(54) GENERATING A SCHEMA-SPECIFIC LOAD STRUCTURE TO LOAD DATA INTO A RELATIONAL DATABASE BASED ON DETERMINING WHETHER THE SCHEMA-SPECIFIC LOAD STRUCTURE ALREADY EXISTS

(75) Inventors: Namit Jain, Folsom, CA (US); Nipun Agarwal, Santa Clara, CA (US); Ravi Murthy, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 324 days.

This patent is subject to a terminal disclaimer.

(21) Appl. No.: 10/718,823

(22) Filed: Nov. 21, 2003

(65) Prior Publication Data

US 2005/0050074 A1    Mar. 3, 2005

Related U.S. Application Data

(63) Continuation-in-part of application No. 10/648,577, filed on Aug. 25, 2003, and a continuation-in-part of application No. 10/648,600, filed on Aug. 25, 2003.

(51) Int. Cl.
*G06F 17/00* (2006.01)
*G06F 17/30* (2006.01)
(52) U.S. Cl. .............................. 707/100; 707/1; 707/102
(58) Field of Classification Search ................ 707/1–4, 707/6, 100–102, 103 R, 103 Y; 706/45–50; 709/217–220
See application file for complete search history.

(56) References Cited

U.S. PATENT DOCUMENTS

| 5,295,261 | A | 3/1994 | Simonetti |
| 5,404,513 | A | 4/1995 | Powers et al. |
| 5,467,471 | A | 11/1995 | Bader |
| 5,680,614 | A | 10/1997 | Bakuya et al. |

(Continued)

FOREIGN PATENT DOCUMENTS

| CA | CN2528492 | * | 1/2005 | ..................... 17/30 |

(Continued)

OTHER PUBLICATIONS

Hsu,C et al. "A metadata system for information modeling and integration", proceedings in systems integration, 1990, pp. 616-624.*

(Continued)

*Primary Examiner*—Khanh B. Pham
(74) *Attorney, Agent, or Firm*—Bingham McCutchen LLP

(57) ABSTRACT

Described is a method and system for storing data into a database, where a determination is made if schema metadata that is used to load the data into the database already exists, and where the existing schema metadata is used to load the data into the database if the schema metadata already exists. If the appropriate schema metadata does not exist, then it is generated and cached so that a later load operation for the same schema type will not need to re-generate this information. In this way, the cost to generate the schema metadata is amortized over multiple load operations to load data of the same schema type. The approach is protocol neutral so that multiple different protocol-based loads can operate with the same schema metadata information and load structures.

24 Claims, 11 Drawing Sheets

U.S. PATENT DOCUMENTS

| | | | |
|---|---|---|---|
| 5,724,577 A | 3/1998 | Exley et al. | |
| 5,734,887 A | 3/1998 | Kingberg et al. | |
| 5,964,407 A | 10/1999 | Sandkleiva | |
| 5,974,407 A | 10/1999 | Sacks | |
| 5,987,506 A | 11/1999 | Carter et al. | |
| 6,038,563 A | 3/2000 | Bapat et al. | |
| 6,055,544 A | 4/2000 | DeRose et al. | |
| 6,061,684 A | 5/2000 | Glasser et al. | |
| 6,085,198 A | 7/2000 | Skinner et al. | |
| 6,128,610 A | 10/2000 | Srinivasan et al. | |
| 6,141,655 A | 10/2000 | Johnson et al. | |
| 6,154,741 A | 11/2000 | Feldman | |
| 6,199,195 B1 | 3/2001 | Goodwin et al. | |
| 6,208,993 B1 | 3/2001 | Shadmon | |
| 6,236,988 B1 | 5/2001 | Aldred | |
| 6,263,332 B1 | 7/2001 | Nasr et al. | |
| 6,269,380 B1 | 7/2001 | Terry et al. | |
| 6,279,006 B1 | 8/2001 | Shigemi et al. | |
| 6,279,007 B1 | 8/2001 | Uppala | |
| 6,298,349 B1 | 10/2001 | Toyoshima et al. | |
| 6,343,287 B1 | 1/2002 | Kumar et al. | |
| 6,356,920 B1 | 3/2002 | Vandersluis | |
| 6,366,934 B1 | 4/2002 | Cheng et al. | |
| 6,370,537 B1 | 4/2002 | Gilbert et al. | |
| 6,418,448 B1* | 7/2002 | Sarkar | 707/104.1 |
| 6,470,344 B1 | 10/2002 | Kothuri et al. | |
| 6,470,494 B1 | 10/2002 | Chan et al. | |
| 6,487,546 B1 | 11/2002 | Witkowski | |
| 6,496,842 B1 | 12/2002 | Lyness | |
| 6,542,911 B2 | 4/2003 | Chakraborty et al. | |
| 6,571,231 B2 | 5/2003 | Sedlar | |
| 6,571,232 B1* | 5/2003 | Goldberg et al. | 707/2 |
| 6,604,100 B1 | 8/2003 | Fernandez et al. | |
| 6,636,845 B2 | 10/2003 | Chau et al. | |
| 6,643,633 B2 | 11/2003 | Chau et al. | |
| 6,675,230 B1 | 1/2004 | Lewallen | |
| 6,718,322 B1 | 4/2004 | Brye | |
| 6,725,212 B2 | 4/2004 | Couch et al. | |
| 6,754,661 B1 | 6/2004 | Hallin et al. | |
| 6,772,180 B1 | 8/2004 | Li et al. | |
| 6,772,350 B1 | 8/2004 | Belani et al. | |
| 6,785,673 B1 | 8/2004 | Fernandez et al. | |
| 6,826,568 B2 | 11/2004 | Bernstein et al. | |
| 6,836,778 B2 | 12/2004 | Manikutty et al. | |
| 6,915,307 B1 | 7/2005 | Mattis et al. | |
| 6,941,511 B1 | 9/2005 | Hind et al. | |
| 6,964,025 B2 | 11/2005 | Angiulo et al. | |
| 7,007,037 B2* | 2/2006 | Govindarajan et al. | 707/104.1 |
| 7,024,425 B2 | 4/2006 | Krishnaprasad et al. | |
| 7,028,037 B1* | 4/2006 | Agarwal et al. | 707/100 |
| 7,031,956 B1 | 4/2006 | Lee et al. | |
| 7,036,072 B1 | 4/2006 | Sulisito et al. | |
| 7,047,250 B1* | 5/2006 | Agarwal et al. | 707/102 |
| 7,047,253 B1* | 5/2006 | Murthy et al. | 707/103 R |
| 7,051,033 B2* | 5/2006 | Agarwal et al. | 707/100 |
| 7,051,039 B1* | 5/2006 | Murthy et al. | 707/102 |
| 7,072,896 B2 | 7/2006 | Lee et al. | |
| 7,096,224 B2 | 8/2006 | Murthy et al. | |
| 7,139,746 B2 | 11/2006 | Shin et al. | |
| 2002/0007363 A1 | 1/2002 | Vaitzblit | |
| 2002/0029229 A1 | 3/2002 | Jakopac et al. | |
| 2002/0078068 A1 | 6/2002 | Krishnaprasad et al. | |
| 2002/0087510 A1 | 7/2002 | Weinberg et al. | |
| 2002/0147763 A1 | 10/2002 | Lee et al. | |
| 2002/0165865 A1* | 11/2002 | Hosokai | 707/100 |
| 2002/0169788 A1* | 11/2002 | Lee et al. | 707/104.1 |
| 2002/0184401 A1 | 12/2002 | Kadel, Jr. et al. | |
| 2003/0004937 A1 | 1/2003 | Salmenkaita et al. | |
| 2003/0009361 A1 | 1/2003 | Hancock et al. | |
| 2003/0033285 A1* | 2/2003 | Jalali et al. | 707/1 |
| 2003/0065659 A1 | 4/2003 | Agarwal et al. | |
| 2003/0093672 A1 | 5/2003 | Cichowlas | |
| 2003/0101194 A1 | 5/2003 | Rys et al. | |
| 2003/0105732 A1* | 6/2003 | Kagalwala et al. | 707/1 |
| 2003/0120665 A1 | 6/2003 | Fox et al. | |
| 2003/0140308 A1* | 7/2003 | Murthy et al. | 715/500 |
| 2003/0154204 A1 | 8/2003 | Chen-Wright et al. | |
| 2003/0172135 A1 | 9/2003 | Bobick et al. | |
| 2003/0182624 A1 | 9/2003 | Large | |
| 2003/0204787 A1 | 10/2003 | Bartucca et al. | |
| 2004/0015936 A1 | 1/2004 | Susarla et al. | |
| 2004/0043758 A1 | 3/2004 | Sorvari et al. | |
| 2004/0044687 A1* | 3/2004 | Vachuska et al. | 707/104.1 |
| 2004/0064466 A1 | 4/2004 | Manicutty et al. | |
| 2004/0088320 A1 | 5/2004 | Perry | |
| 2004/0117359 A1 | 6/2004 | Snodgrass et al. | |
| 2004/0162832 A1* | 8/2004 | Dettinger et al. | 707/100 |
| 2004/0176958 A1 | 9/2004 | Salmenkaita et al. | |
| 2004/0220912 A1 | 11/2004 | Manikutty et al. | |
| 2004/0220927 A1 | 11/2004 | Murthy et al. | |
| 2004/0225680 A1 | 11/2004 | Cameron et al. | |
| 2005/0010896 A1 | 1/2005 | Meliksetian et al. | |
| 2005/0050056 A1* | 3/2005 | Idicula et al. | 707/100 |
| 2005/0050058 A1* | 3/2005 | Jain et al. | 707/100 |
| 2005/0050092 A1* | 3/2005 | Jain et al. | 707/104.1 |
| 2005/0050105 A1* | 3/2005 | Idicula et al. | 707/200 |
| 2005/0228818 A1 | 10/2005 | Murthy et al. | |
| 2006/0031233 A1 | 2/2006 | Liu et al. | |
| 2006/0036935 A1 | 2/2006 | Warner et al. | |

FOREIGN PATENT DOCUMENTS

| | | | | |
|---|---|---|---|---|
| EP | 1367503 | * | 12/2003 | 17/30 |
| JP | 60-218142 | | 10/1985 | |
| JP | 2-165353 | | 6/1990 | |
| JP | 8-249159 | | 9/1996 | |
| WO | WO97/03406 | * | 1/1997 | 17/30 |
| WO | WO 00/049533 | | 8/2000 | |
| WO | WO 01/042881 A2 | | 6/2001 | |
| WO | WO 01/59602 | * | 8/2001 | 17/30 |
| WO | WO 01/059602 A1 | | 8/2001 | |
| WO | WO 01/61566 | * | 8/2001 | 17/30 |
| WO | WO 01/061566 A1 | | 8/2001 | |
| WO | WO 2004/095312 | * | 11/2004 | 17/30 |

OTHER PUBLICATIONS

Lenz,H, "the conceptual schema and external schemata of metadatabases", proceedings in international working conference on scientific and statistical database management, 1994, pp. 160-165.*

Rosenthal, A et al. "administering propgating metadata in large, multi-layer database systems", 1999, pp. 11-16.*

Mathew B Jones et al. "managing scientific metadata", IEEE internet computing, Oct. 2001, pp. 59-68.*

Berkley,C et al. "Metacat: a schema-independent XML database system",, Thirteenth international conference on scientific and statistical database management, 2001, pp. 171-179.*

Tan,J Zaslavsky et al;. "Meta object approach to database schema integration", proceedings, DOA, International symposium on Distributed objects and applications, 2000 pp. 145-154.*

Krippendorf,M et al. "The translation of star schema into entity-relationship diagrams", Proceedings, eight international workshop on database and expert systems applications, 1997, pp. 390-395.*

Bourret, R. et al. "A Generic Load/Extract Utility for Data Transfer Between XML Documents and Relational Databases" Proceedings for the 2nd Int'l Workshop on Advanced Issues of E-Commerce and Web-Based Information Systems, IEEE Computing Society, Jun. 8-9, 2000, pp. 134-143.

Braga, D. et al. "A Graphical Environment to Query XML Data with XQuery" Proceedings of the Fourth International Conference on Web Information Systems Engineering (WISE'03), IEEE, 2003, 10 pages.

Cheng, J. et al. "IBM DB2 XML Extender, An end-to-end solution for storing and retrieving XML documents" IEEE, ICDE'00 Conference, San Diego, CA, Feb. 2000, 128 pages.

Jajodia, S. et al. "Toward a Multilevel Secure Relational Data Model" ACM, 8393 SIGMOD Record, Jun. 20, 1991, XP 000364619, No. 2, pp. 50-59.

Mi-Ok, C. et al. "Design and Implementation of an Object-Oriented Multimedia DBMS Tightly Coupled with Information Retrieval Functions" Proceedings of the 17th IASTED Int'l Conference on Applied Informatics (AI'99), Innsbruck, Austria, Feb. 15-18, 1999, abstract.

Noser, H. et al. "Dynamic 3D Visualization of Database-Defined Tree Structures on the WWW by Using Rewriting Systems"; IEEE, 2000, XP-002262516, pp. 247-254.

Peng, F. et al, "XPath Queries on Streaming Data" Proceedings of the 2003 ACM SIGMOD Int'l Conference on Management of Data (SIGMOD 2003), San Diego, CA, Jun. 9-12, 2003, pp. 431-442.

Shanmugasundaram, J. et al. "Querying XML Views of Relational Data" Proceedings of the 27th Very Large Databases Conference, Rome, Italy, Sep. 2001, pp. 261-270.

Vion-Dury, J-Y. "XPath on Left and Right Side of Rules: Toward Compact XML Tree Rewriting through Node Patterns" Proceedings of the 2003 ACM Symposium on Document Engineering, Grenoble, France, Nov. 20-22, 2003, ACM Press, pp. 19-25.

Vorthmann, S. "Beyond Schemas, Schema Adjuncts and the Outside World" Markup Languages, Online!, Jun. 2000, vol. 2, No. 3, pp. 1-8.

Informix Corporation "Universal Data Option for Informix Dynamic Server", 1998, 8 pages.

Oracle Corporation "10.1. What is the Direct Path?" from Oracle SQL*Loader: The Definitive Guide, 2001, 29 pgs., published by O'Reilly & Associates.

Oracle Corporation "Conventional and Direct Path Loads" Chapt. 9 from Oracle 9i Database Utilities Release 2 (9.2), 29 pgs., Copyright 2002 Oracle Corporation. Available online at http://www.utexas.edu/its/unix/reference/oracledocs/v92/B10501_01/server.920/a96652/ch09.htm.

Oracle Corporation "Objects, Collections, and OPAQUE Types" from Oracle9i SQLJ Developer's Guide and Reference Release 2 (9.2). Copyright 1999, 2002. Available online at http://www.lc.leidenuniv.nl/awcourse/oracle/java.920/a96655/objcoll.htm.

Sun Microsystems "SerialJavaObject (Java 2 Platform SE 5.0)", available online at http://java.sun.com/j2se/1.5.0/docs/api/javax/sql/rowset/serial/SerialJavaObject/html. Accessed Apr. 8, 2006. Copyright 2004 Sun Microsystems.

Chen, R-S, et al. "Developing an XML Framework for Metadata System" Trinity College, Dublin, Proceedings of the 1st Int'l Symposium on Information and Communication, pp. 267-272.

Ipedo, Inc., "Ipedo XML Database 3.1: Developer's Guide" 2001, XP-002306148, 12 pages.

Li, X. "A Survey of Schema Evolution in Object-Oriented Databases" IEEE, 1999, pp. 362-371.

Manolescu, D., Review of "Metadata solutions: using metamodels, repositories, XML, and enterprise portals to generate information on demand by Adrienne Tannebaum", ACM Press, Mar. 2003, vol. 28, Issue 2, p. 38.

McCluskey, G. "Using Java Reflection" Jan. 1998, 8 pgs., available online at http://java.sun.com/developer/technicalArticles/ALT/Reflection/.

Parkerson, C. "Ipedo XML Database 3.1 Now Available" Jul. 22, 2002, XP-002306149, pp. 1-2.

Rashid, A. "A Framework for Customisable Schema Evolution in Object-Oriented Databases" Proceedings of the 7th Int'l Database Engineering and Applications Symposium (IDEAS'03), IEEE, 2003, 5 pages.

Riggs, R. et al. "Pickling State in Java™ System" XP002128178, 10 pages.

Sosnoski, D. "Java programming dynamics, Part 2: Introducing reflection" Jun. 3, 2003. Available online at http://www-128.ibm.com/developerworks/library/j-dyn0603/.

Su, H. et al. "XEM: XML Evolution Management" Jan. 2002, XP-002306151, pp. 1-32.

Higgins, S., Oracle Corporation, "Oracle9i, XML Database Developer's Guide - Oracle XML DB" Release 2 (9.2), Oct. 2002, Part No. A96620-02, Chapter 21-Index.

Türker, C., "Schema Evolution in SQL-99 and Commercial (Object-) Relational DBMS" 9th Int'l Workshop on Foundations of Models and Languages for Data and Objects Fomlado/Demm 2000, Sep. 18, 2000, XP-002306150, pp. 1-32.

Wang, Y. et al. "X-Diff: An Effective Change Detection Algorithm for XML Documents" Proceedings of the 19th Int'l Conference on Data Engineering (ICDE'03), IEEE, 2003, pp. 519-530.

Written Opinion for PCT/US2004/027464 dated Dec. 8, 2004, 6 pgs.

International Preliminary Report on Patentability for PCT/US2004/027464 dated Dec. 23, 2005, 13 pgs.

Japan Patent Office "Notice of Ground of Rejection" with English translation, application 569322/2000, dated Apr. 27, 2005, 6 pgs.

Office Action dated Apr. 14, 2006 for U.S. Appl. No. 10/648,600.

Office Action dated Oct. 11, 2006 for U.S. Appl. No. 10/648,600.

Examiner's Answer dated Aug. 9, 2007 for U.S. Appl. No. 10/648,600.

Office Action dated Apr. 17, 2006 for U.S. Appl. No. 10/648,577.

Office Action dated Oct. 30, 2006 for U.S. Appl. No. 10/648,577.

Examiner's Answer dated Aug. 21, 2007 for U.S. Appl. No. 10/648,577.

"10.1 What is the Direct Path?" from Oracle SQL*Loader: The Definitive Guide. Published by O'Reilly & Associates, 2001.

"Conventional and Direct Path Loads" from Oracle 9i Database Utilities Release 2. Copyright 2002 Oracle Corporation. Available online at http://www.utexas.edu/its/unix/reference/oracledocs/v92/B10501_01/server.920/a96652/ch09.htm.

"Java programming dynamics, Part 2: Introducing reflection" by Dennis Sosnoski. Published Jun. 3, 2003. Available online at http://www-128.ibm.com/developerworks/library/j-dyn0603/.

"Objects, Collections, and OPAQUE Types" from Oracle9i SQLJ Developer's Guide and Reference Release 2 (9.2). Copyright 1999, 2002. Available online at http://www.lc.leidenuniv.nl/awcourse/oracle/java.920/a96655/objcoll.htm.

"SerialJavaObject (Java 2 Platform SE 5.0)", available online at http://java.sun.com/j2se/1.5.0/docs/api/javax/sql/rowset/serial/SerialJavaObject.html. Accessed Apr. 8, 2006. Copyright 2004 Sun Microsystems.

"Using Java Reflection" by Glen McCluskey. Published Jan. 1998. Available online at http://java.sun.com/developer/technicalArticles/ALT/Reflection/.

Chen, R-S, et al. "Developing an XML Framework for Metadata System" Trinity College, Dublin, Proceedings of the 1st Int'l Symposium on Information and Communication, pp. 267-272, 2003.

Informix Corporation "Universal Data Option for Informix Dynamic Server", 1998, 8 pages.

Ipedo, Inc., "Ipedo XML Database 3.1: Developer's Guide" 2001, XP-002306148, 12 pages pp. 74-78.

Li, X. "A Survey of Schema Evolution in Object-Oriented Databases" IEEE, 1999, pp. 362-371.

Manolescu, D., Review of "Metadata solutions: using metamodels, repositories, XML, and enterprise portals to generate information on demand by Adrienne Tannebaum", ACM Press, Mar. 2003, vol. 28, Issue 2, p. 38.

Parkerson, C. "Ipedo XML Database 3.1 Now Available" Jul. 22, 2002, XP-002306149, pp. 1-2.

Rashid, A. "A Framework for Customisable Schema Evolution in Object-Oriented Databases" Proceedings of the 7th Int'l Database Engineering and Applications Symposium (IDEAS'03). IEEE, 2003, 5 pages.

Riggs, R. et al. "Pickling State in Java™ System" XP002128178, 10 pages, 1996.

Su, H. et al. "XEM: XML Evolution Management" Jan. 2002, XP-002306151, pp. 1-32.

Türker, C., "Schema Evolution in SQL-99 and Commercial (Object-) Relational DBMS" 9th Int'l Workshop on Foundations of Models and Languages for Data and Objects Fomlado/Demm 2000, Sep. 18, 2000, XP-002306150, pp. 1-32.

Wang, Y. et al. "X-Diff: An Effective Change Detection Algorithm for XML Documents" Proceedings of the 19th Int'l Conference on Data Engineering (ICDE'03), IEEE, 2003, pp. 519-530.

* cited by examiner

FIG.6A
← 600

602
FIRST TYPE IMPLEMENTOR REGISTERS, WITH A CLIENT APPLICATION, FIRST ROUTINES THAT ARE IMPLEMENTED BY THE FIRST TYPE IMPLEMENTOR

604
CLIENT APPLICATION ADDS, TO A DISPATCH TABLE, AN ENTRY THAT INDICATES AN ASSOCIATION BETWEEN THE FIRST ROUTINES AND A PARENT TYPE THAT THE FIRST TYPE IMPLEMENTOR IMPLEMENTS

606
SECOND TYPE IMPLEMENTOR REGISTERS, WITH THE CLIENT APPLICATION, SECOND ROUTINES THAT ARE IMPLEMENTED BY THE SECOND TYPE IMPLEMENTOR

608
CLIENT APPLICATION ADDS, TO THE DISPATCH TABLE, AN ENTRY THAT INDICATES AN ASSOCIATION BETWEEN THE SECOND ROUTINES AND A CHILD TYPE THAT THE SECOND TYPE IMPLEMENTOR IMPLEMENTS

TO 610

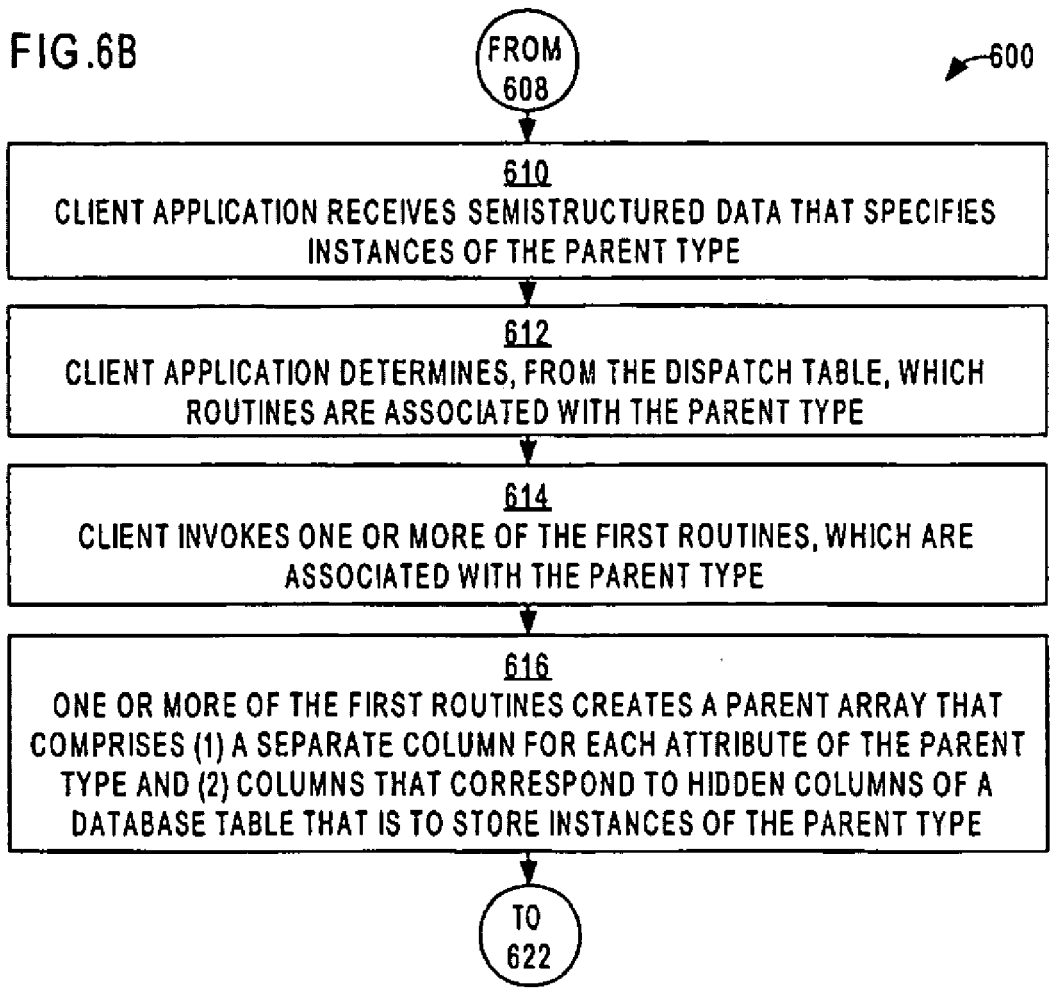

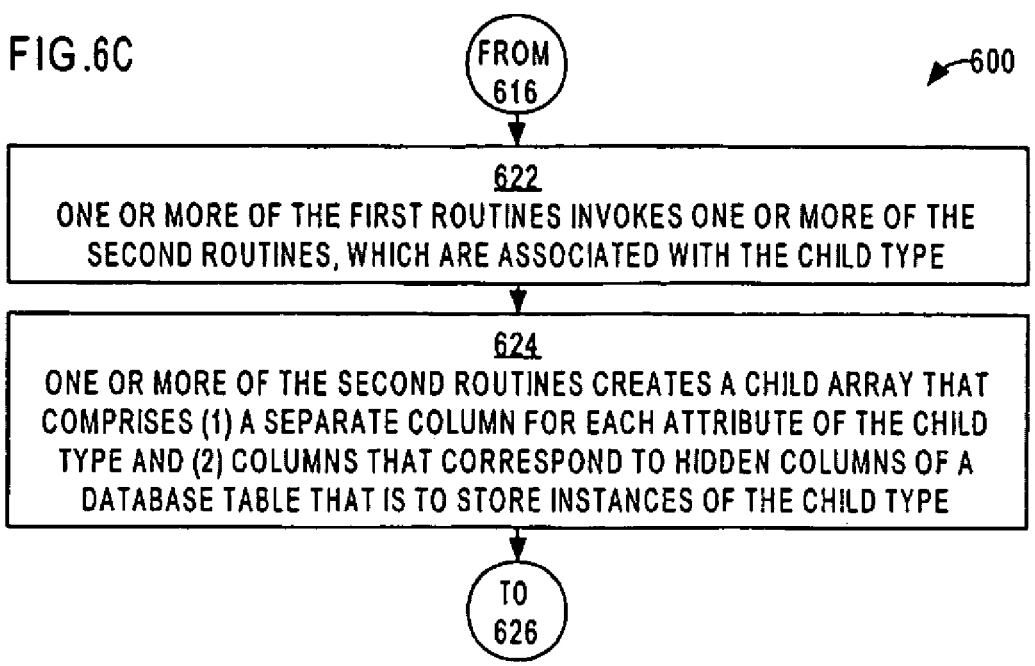

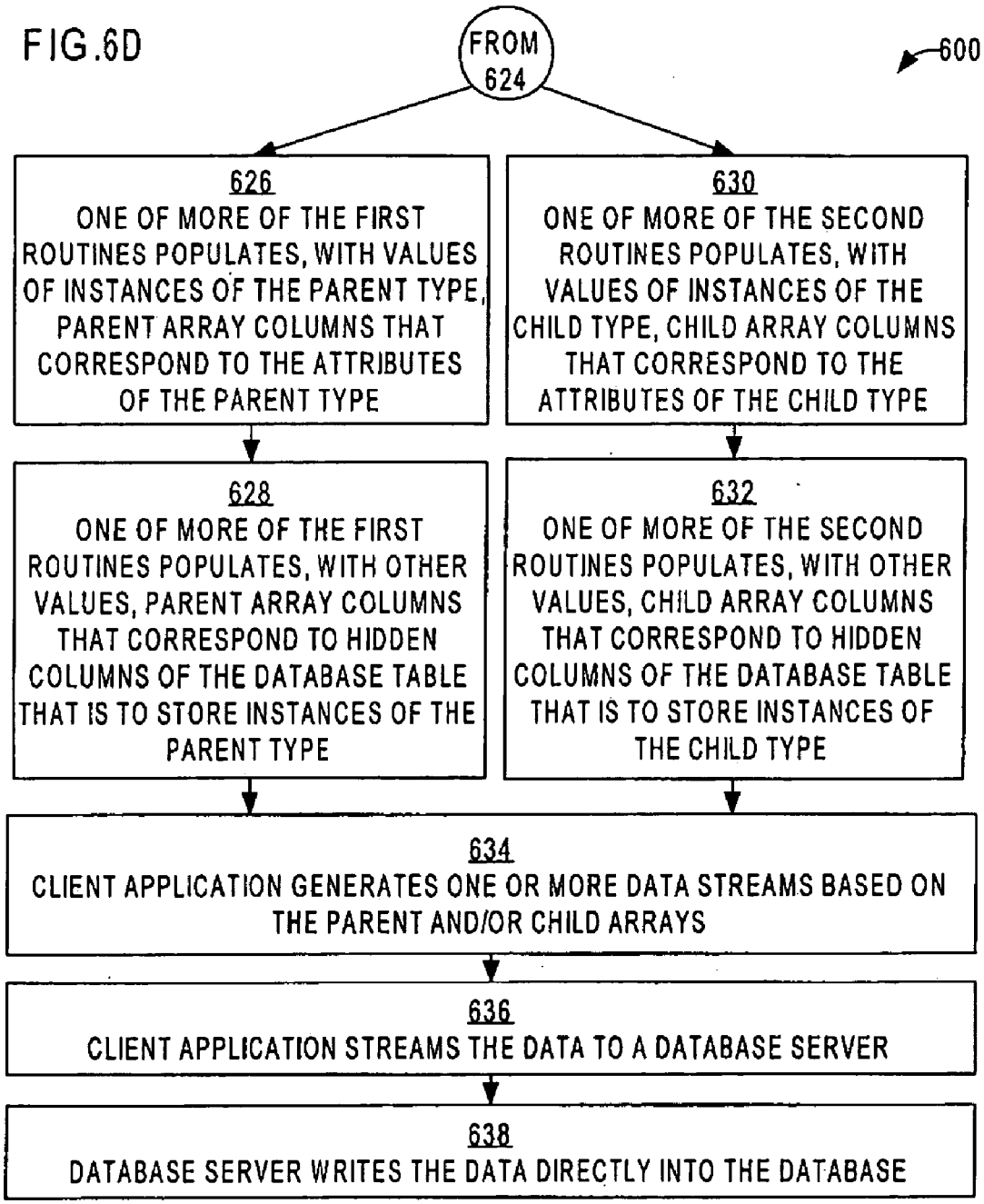

GENERATING A SCHEMA-SPECIFIC LOAD STRUCTURE TO LOAD DATA INTO A RELATIONAL DATABASE BASED ON DETERMINING WHETHER THE SCHEMA-SPECIFIC LOAD STRUCTURE ALREADY EXISTS

RELATED APPLICATIONS

The present application is a continuation-in-part of U.S. patent application Ser. No. 10/648,577, entitled DIRECT LOADING OF OPAQUE TYPES, (Attorney Docket No. 50277-2236) and U.S. patent application Ser. No. 10/648,600, entitled DIRECT LOADING OF SEMISTRUCTURED DATA, by Namit Jain, Nipun Agarwal, and Ravi Murthy (Attorney Docket No. 50277-2235), both filed on Aug. 25, 2003, which are hereby incorporated by reference in their entirety.

The present application is also related to the following U.S. patent applications, the entire contents of which are incorporated herein by reference for all purposes:

U.S. Pat. No. 7,007,037, filed on Jul. 9, 2002, entitled OPAQUE TYPES, by Rajagopalan Govindarajan, Viswanathan Krishnamurthy, and Anil Nori;

U.S. Pat. No. 7,028,037, filed on Sep. 27, 2002, entitled OPERATORS FOR ACCESSING HIERARCHICAL DATA IN A RELATIONAL SYSTEM, by Nipun Agarwal, Ravi Murthy, Eric Sedlar, Sivasankaran Chandrasekar and Fei Ge;

U.S. Pat. No. 7,051,033, filed on Sep. 27, 2002, entitled PROVIDING A CONSISTENT HIERARCHICAL ABSTRACTION OF RELATIONAL DATA, by Nipun Agarwal, Eric Sedlar, Ravi Murthy and Namit Jain;

U.S. Pat. No. 7,096,224, filed on Sep. 27, 2002, entitled MECHANISM FOR MAPPING XML SCHEMAS TO OBJECT-RELATIONAL DATABASE SYSTEMS, by Ravi Murthy, Muralidhar Krishnaprasad, Sivasankaran Chandrasekar, Eric Sedlar, Vishu Krishnamurthy and Nipun Agarwal;

U.S. Pat. No. 7,047,250, filed on Sep. 27, 2002, entitled INDEXING TO EFFICIENTLY MANAGE VERSIONED DATA IN A DATABASE SYSTEM, by Nipun Agarwal, Eric Sedlar and Ravi Murthy;

U.S. Pat. No 7,047,253, filed on Sep. 27, 2002, entitled MECHANISMS FOR STORING CONTENT AND PROPERTIES OF HIERARCHICALLY ORGANIZED RESOURCES, by Ravi Murthy, Eric Sedlar, Nipun Agarwal, and Neema Jalali;

U.S. Pat. No. 7,051,039, filed on Sep. 27, 2002, entitled MECHANISM FOR UNIFORM ACCESS CONTROL IN A DATABASE SYSTEM, by Ravi Murthy, Eric Sedlar, Nipun Agarwal, Sam Idicula, and Nicolas Montoya;

U.S. Pat. No. 7,092,967, filed on Sep. 27, 2002, entitled LOADABLE UNITS FOR LAZY MANIFESTATION OF XML DOCUMENTS by Syam Pannala, Eric Sedlar, Bhushan Khaladkar, Ravi Murthy, Sivasankaran Chandrasekar, and Nipun Agarwal;

U.S. patent application Ser. No. 10/648,749, filed on Aug. 25, 2003, entitled IN-PLACE EVOLUTION OF XML SCHEMAS, by Sam Idicula, Nipun Agarwal, Ravi Murthy, and Sivasankaran Chandrasekar (Attorney Docket No. 50277-2237); and U.S. patent application Ser. No. 10/648,497, filed on Aug. 25, 2003, entitled MECHANISM TO ENABLE EVOLVING XML SCHEMA, by Sam Idicula, Nipun Agarwal, Ravi Murthy, Eric Sedlar, and Sivasankaran Chandrasekar (Attorney Docket No. 50277-2238).

BACKGROUND AND SUMMARY

The present invention relates to database systems, and in particular, to techniques for directly loading data into a database.

Structured data often conforms to a type definition. For example, a type definition for a "person" type may define distinct attributes such as "name," "birthdate," "height," "weight," and "gender." Each "instance" of a particular type comprises a separate value for each of the attributes defined by the particular type. For example, an instance of the "person" type might comprise values such as "Fred Brown," "Jan. 1, 1980," "72 inches," "240 pounds," and "male." Each attribute is also of a type. For example, the "name" attribute might be of a "string" type, the "birthdate" attribute might be of "date" type, and the "gender" attribute might be of an "enumerated" type. Structured data might comprise multiple different instances of the same type.

Different approaches may be used to store structured data into a database. One such approach is called "conventional path loading." According to conventional path loading, a client application parses structured data that comprises one or more instances of a type. Values within the structured data correspond to attributes of the type. The client application generates Structured Query Language (SQL) commands, such as INSERT commands, that, when executed by a database server, cause the database server to insert the values into corresponding columns of a database table. Unfortunately, due to its heavy use of the SQL engine, conventional path loading often suffers in terms of performance and memory consumption.

Another approach for storing structured data into a database is called "direct path loading." Through direct path loading, values within structured data are stored directly into a database without going through the SQL engine. By consulting a control file that is associated with the structured data, a client application can determine the types to which instances within the structured data conform. If the structures of the types are defined to the client application, then, based on those structures, the client application can create an array that comprises columns that correspond to the types' attributes. The client application can populate each attribute's corresponding column with values that correspond to that attribute. Once the array is populated, the client application can convert the array into a stream, which the database server can directly convert into the database's data blocks. Direct path loading exhibits performance superior to that of conventional path loading.

Some types indicated by a control file may be standard types that are defined to a client application. A scalar type is an example of such a standard type. The client application has information about the characteristics of a scalar type, such as the maximum storage size of a scalar type. With this information, the client can generate the data stream as described above.

However, some types indicated by a control file might not be among the types that are defined to the client application. A type indicated by a control file might have a structure that is defined only to a program that implements that type. Although the type might comprise attributes that are of standard types, the control file and the client application might lack any information about the number or types of such attributes.

Without such information, the client application cannot generate or populate an array that comprises a separate column for each such attribute. The client application does not possess sufficient information to map values that correspond to such attributes to corresponding columns of a table in a relational database. Consequently, there is no effective way for the client application to store instances of such a type in a database using the direct path loading approach.

Types that are not defined to a client application are called "opaque types" relative to the client application, because the internal structure of such types is obscured from the client application. The internal structure of an opaque type, including the number and types of attributes of the opaque type, often are defined only to a program that implements the opaque type. Such a program may be external to both the client application and the database server.

It may not be practical to modify a client application every time that a new type is introduced, so that the new type is defined to the client application. Additionally, the structures of some existing types may change as time passes. It may be impractical to modify a client application every time that the structure of an existing type changes.

One kind of opaque type is an XML type. An example of an XML type is provided in co-pending U.S. Pat. No. 7,096,224. "XML" stands for "Extensible Markup Language." An XML schema is metadata that describes a hierarchical structure. Instances of the XML schema comprise data that conforms to the structure described by the XML schema. Through XML elements expressed in the structure, an XML schema defines one or more types. XML elements in such a structure may be mapped to columns of database tables. Using the conventional path loading approach, values that correspond to the XML elements may be stored in the columns that are mapped to those XML elements.

An XML type is special because an XML type may define alternative structures to which instances of the XML type may conform. For example, an XML type definition might indicate that one or more attributes of the XML type are optional. Therefore, if attributes "A," "B," and "C" are optional, then one instance of the XML type might comprise a value for attribute "A," but no values for attributes "B" or "C," while another instance of the XML type might comprise a value for attribute "B," but no values for attributes "A" or "C." Because the instances may conform to alternative defined structures rather than a single defined structure, the instances may be said to comprise "semistructured" data rather than "structured" data.

Related application Ser. No. 10/648,577 describes an approach for efficiently performing direct path loading to store opaque data. Related application Ser. No. 10/648,600 describes an approach for efficiently performing direct path loading to store semistructured data.

Described herein is a method and mechanism for efficiently loading data into a database using any protocol or client. Examples of such clients/protocols include the File Transfer Protocol (FTP) and Hypertext Transfer Protocol (HTTP). In one embodiment, disclosed is a method and system for storing data into a database, where a determination is made if schema metadata that is used to load the data into the database already exists, and where the existing schema metadata is used to load the data into the database if the schema metadata already exists. If the appropriate schema metadata does not exist, then it is generated and cached so that a later load operation for the same schema type will not need to re-generate this information. In this way, the cost to generate the schema metadata is amortized over multiple load operations to load data of the same schema type. The approach is protocol neutral so that multiple different protocol-based loads can operate with the same schema metadata information and load structures.

Further details of aspects, objects, and advantages of the invention are described below in the detailed description, drawings, and claims.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 6A–6D are flow diagrams that illustrate a technique, according to an embodiment of the present invention, for storing semistructured data in a database according to the direct path loading approach.

DETAILED DESCRIPTION OF THE INVENTION

Figure 1A:
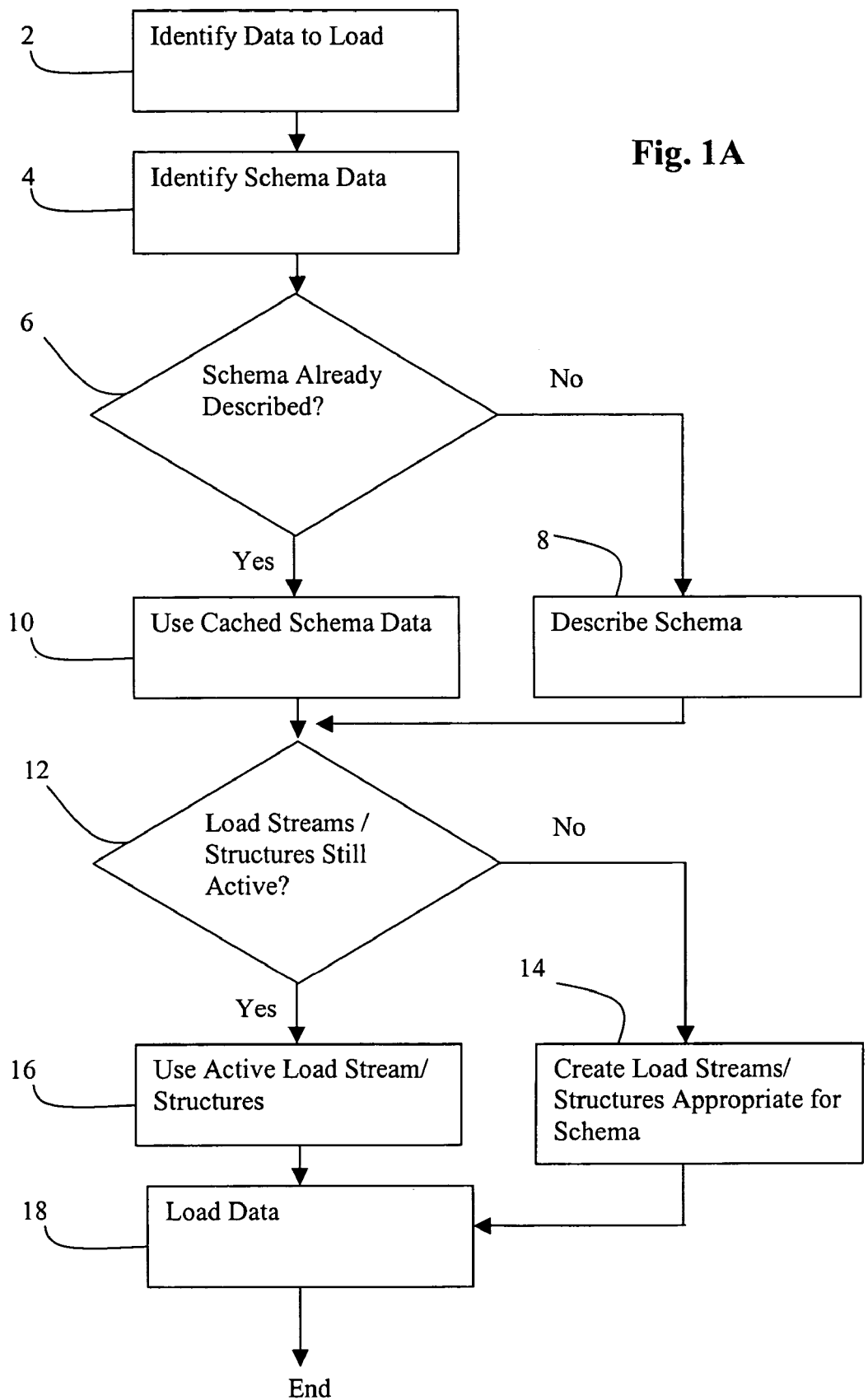
FIG. 1A is a flowchart of a process for loading data into a database according to an embodiment of the invention.

Described herein is a method and mechanism for efficiently loading data into a database using any protocol or client. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

It is desirable to store data, such as semistructured data, in a database, e.g., according to the direct path loading approach. The present invention can be used to efficiently load data into a database using any protocol or client, e.g., FTP, HTTP, or datapump.

The amount or granularity of data that is loaded by any particular load operation is highly dependent upon the specific needs of the system, client, or user at any moment in time. The range of variation in the amount of data to load can be quite significant, with some operations loading one row of data at a time into a database, while other operations loading millions of rows of data at a time into the database.

In some cases, the typical operating parameters or usage characteristics of a given protocol may relate to the amount or granularity of data that is loaded into a database. For example, the amount of data that is loaded for each FTP or HTTP related load operation to a database is typically far less than the amount of data that may be loaded by large-scale native database-load operations, e.g., for large data warehouse or OLTP archive/load operations. This is not to say that a FTP or HTTP-related load operation cannot load large quantities of data in a given operation, but in normal usage, it is not uncommon for a given FTP/HTTP operation to load one or just a few rows of data for each such load operation.

The total cost of the operation to load data into the database can be roughly calculated by taking into account: (1) the preparatory cost to analyze and prepare the system for the load operation; and (2) the cost to insert and store data in the database. The data can be inserted into a relational database using SQL or a direct load process as described above.

The preparatory process to "scan" data and to prepare structures to load the data into the database consumes an amount of system resources. As described in more detail below, these costs result from the process of parsing the data to determine the schema and schema metadata that are associated with the data (e.g., number of columns and column types) as well as preparing the structures actually used to load the data (e.g., allocating and initializing column arrays). These preparatory costs are relatively constant regardless of the amount of data to load for any particular operation.

The cost to insert and store data are the direct costs associated with populating the load structures and storing/saving the data into the database. These costs are directly tied to the amount of data that must be loaded, and will increase as a function of the quantity, of data.

If the load operation for a given operation loads a large amount of data into the database, then the amount of resources that is needed to identify the schema and prepare the load structures becomes relatively insignificant relative to the overall process of loading the data.

However, as noted above, certain types of protocol-related load operations have the characteristic of typically using a large number of operations that each load only a small quantity of data per operation. If the amount of data to load for a given operation is small, then the cost of the preparatory process becomes far more significant to the overall load process.

According to a first embodiment of the invention, the overall cost of performing the preparatory operations for loading data is amortized over multiple operations, and is therefore reduced per operation, by caching the results of the scan process in the system. Multiple load operations for the same schema type can used the cached data from a prior processing of the schema to load data into the database. In this way, the cost is spread among all of the load operations that use the cached information. In an additional embodiment, the load structures and streams that are created to implement loading of data into the database are not released after a load operation for which they are created; instead, these structures and streams are maintained and re-used for later operations that load data of the same schema type.

According to one embodiment of the present invention, to load data for a non-native datatype, such as a type of semistructured data, a program that implements a type to which semistructured data conforms (a "type implementor") registers, with a client application, one or more routines that are associated with the type. The type implementor, which is external to both the client application and a database server that manages the database, implements the routines. In response to the registration, the client application adds an entry to a dispatch table. The entry indicates the association between the type and the routines.

The client application reads semistructured data that comprises instances of the type. By consulting a control file that is associated with the data, the client application determines that the instances are of the type. The structure of the type, the number of attributes of the type, and the types of those attributes are not defined to the client application. Therefore, the client application locates an entry in the dispatch table that indicates the specified type. The entry indicates the association between the specified type and the routines that are implemented by the type implementor. For example, an entry might indicate an association between an XML type and a set of routines that are implemented by the XML type's implementor.

The client application invokes the routines. One or more of the routines creates an array for storing instances of the type. The array comprises a separate column for each attribute of the type. One or more of the routines populates the columns with values that are specified in the data. Each such value corresponds to a separate attribute of the type. One or more of the routines stores each such value in a column that corresponds to an attribute that corresponds to that value.

The array further may comprise one or more additional columns that correspond to one or more hidden columns of a database table that is to store at least parts of instances of the type. Hidden columns store values that are not displayed to a user when the database table that contains the hidden columns is queried.

One or more of the routines populates the additional columns with additional values that typically are not specified in the data. For example, for each row of the array, a routine might generate a different instance identifier to distinguish the instance stored in that row from other instances stored in other rows. The routine might populate one of the additional columns with the instance identifiers.

For another example, for each row of the array, a routine might generate a different positional descriptor that indicates the position of the various attributes within the instance stored in that row. Such positional descriptors are especially useful in relation to instances of an XML type. Although XML documents express data according to a structure in which each attribute value is located at a different position relative to other attribute values, database table rows that store the values of such XML instances typically are not ordered in a way that indicates a position. By populating an additional column with positional descriptors, the original structure of an XML document can be preserved.

Attributes of one type may conform to other types. For example, a top-level XML type might indicate a first attribute that is of a scalar type, and a second attribute that is of a "purchase order" type. The "purchase order" type also might indicate several attributes. When a type is nested within another type in this manner, routines associated with the nested type are invoked according to the technique described above. For each nested type, the routines associated with that nested type create and populate a separate array that corresponds to that nested type. References to an array generated for a nested type are stored in a corresponding column of an array generated for the type that indicates an attribute that is of the nested type.

With the arrays populated, the client application converts the arrays, including any additional columns, into a data stream, which the database server understands and converts the data stream to the format of the data blocks in the database. As a result, values that were stored in array columns that correspond to database table hidden columns are stored in those hidden columns. Note that the SQL engine can be completely bypassed in the whole process.

Thus, the client application stores semistructured data in the database according to the direct path loading approach. Because the direct path loading approach does not require the SQL engine to load each row of data, the direct path loading approach is faster and consumes less memory than the conventional path loading approach described above. Because type implementors are external to both the client application and the database server, instances of new types can be stored in the database without modifying either the client application or the database server.

The code that implements the routines that are associated with a particular type may be centralized within the particular type's implementor rather than being distributed among multiple separate programmatic components. Such centralization promotes savings in terms of time and money.

Reuse of Structures to Load Data Having Similar Schema

FIG. 1A is a flowchart of a process for efficiently loading data into a database according to an embodiment of the invention. At 2, identification is made of the data that is to be loaded into a database. For example, consider if a FTP client wishes to load data into a database for XML-based data types. The operation to load the XML document into the database is initiated, e.g., using the GET or PUT commands. The GET or PUT operation will identify the specific XML document to load into the database.

At 4, identification is made of the schema for the data to load. In one embodiment, the schema identifier information can be determined based upon schema identifiers placed in the header or body of the document to load into the database. For example, for an XML-based document, the schema identifier is placed in the document itself.

A determination is made whether the preparatory process to scan the data and determine the schema metadata information has already been performed and the results cached in the system (6). The preparatory process might have already been performed, for example, when loading a prior instance of the same XML document type.

If the correct schema metadata information is not already cached in the system, then at 8, the schema is described and the appropriate metadata generated. For example, when loading data into a relational or object-relational database, this action will determine the identity, number, and types of columns for the tables into which data will be inserted. In addition, one or more of the columns may contain pointers or refs to other columns. The present action will also identify these other columns that are referenced by the primary columns. In one embodiment, the action of box 8 is referred to as the Describe procedure, and may be implemented as discussed in more detail below. The metadata results are cached so that it can be later re-used when attempting to load another instance of the same schema type.

If the Describe information for the data to load already exists in the system, then it is re-used to load the data for the present instance of the data to load (10).

A determination is made whether the appropriate structures and streams that should be prepared to load the data into the database have already been prepared, initiated, and still exist in the system (12). Examples of such structures and streams are described with respect to FIGS. 1C–6D and may include such structures as column arrays corresponding to the schema of the data.

If such structures and streams already exist for the schema of the present data to load, then they are identified to be used to load the data (16). If they do not exist, then they are created (14), e.g., using the processes described with respect to FIGS. 1C–6D. At 18, the data can now be loaded into the database.

Therefore, this process allows data to be loaded into a database very efficiently, particularly for operations involving many separate loads of small quantities of data. In some cases, a single instance, e.g., an XMLtype instance, leads to data being loaded into multiple tables. In one embodiment, multiple streams can be created for loading the data, which can be parallelized for even faster loads.

Figure 1B:
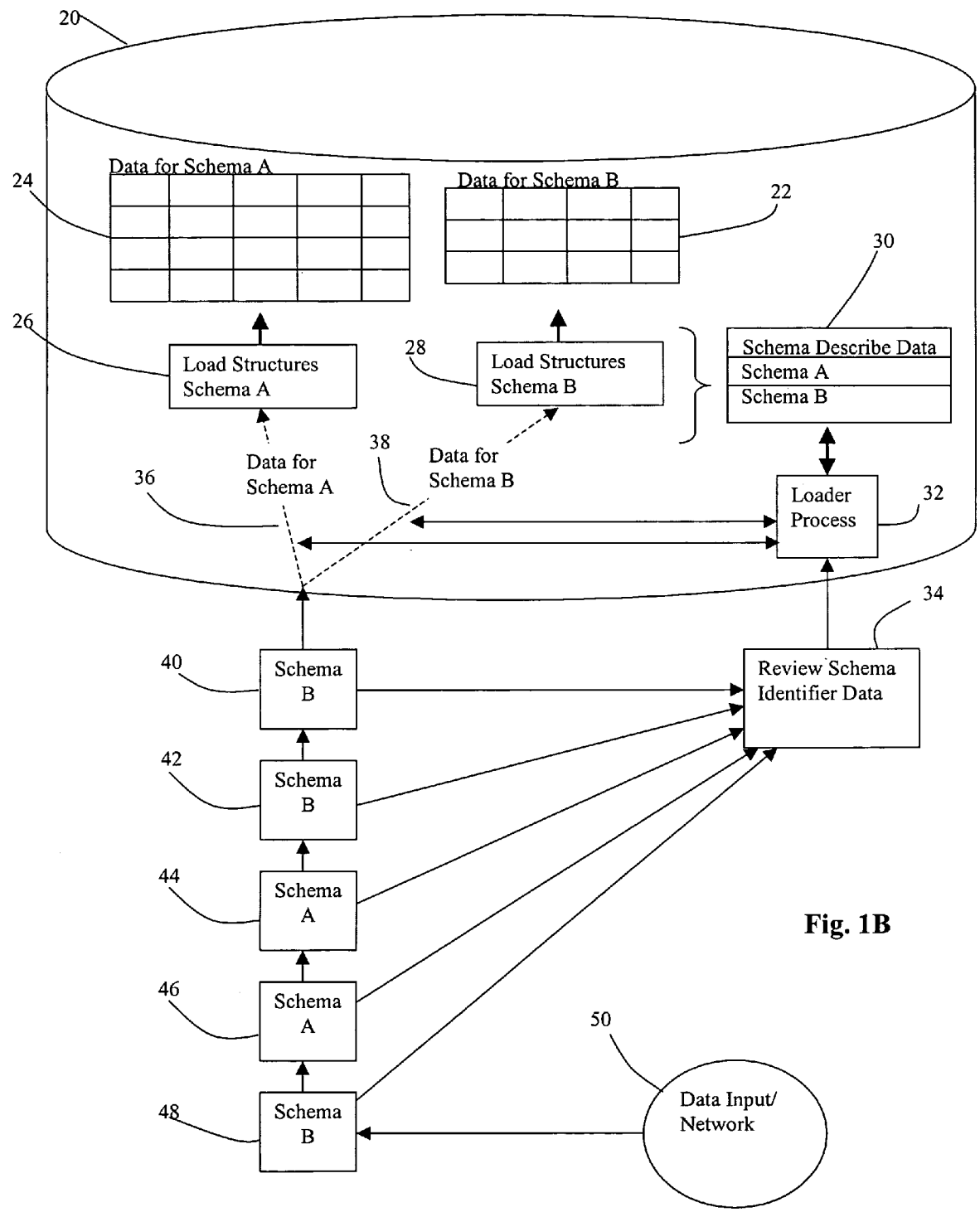
FIG. 1B illustrates example structures for efficiently loading data into a database.

FIG. 1B illustrates some example structures that are employed to efficiently load data into a database 20 according to the present embodiment of the invention. In this example configuration, a series of data 40, 42, 44, 46, and 48 are to be loaded into database 20. These data 40, 42, 44, 46, and 48 are received over a network or other data input path 50, e.g., from a FTP client.

A loader process 32 handles the function of loading data into database 20. It is noted that term "process" as used herein may comprise any type of entity such as threads, tasks, or processes, and is not limited to any particular type of entity.

When a first data 40 is identified to be loaded into database 20, a determination is made regarding the identity of the schema for data 40. This may be performed by loader process 32 or a separate process 34. Assume data 40 is associated with Schema B.

The loader process 32 makes a determination whether the Describe information for Schema B already exists in the system, e.g., at cache 30. If not, then this information is acquired, e.g., by scanning, parsing, and analyzing the data 40 and placing the resulting metadata information in cache 30 for subsequent loads of data having the same schema type.

If they do not yet exist, the appropriate load structures 28 are created for Schema B. If they already exist, then they are re-used to load data 40 through path 38 into database table(s) 22.

The next data 42 to load is another instance of Schema B. Since the schema information 30 and load structures 28 for Schema B already exist, the data can be loaded without incurring any additional costs to setup schema information or load structures.

The next data 44 to load is an instance of Schema A, which is another schema type. A determination is made regarding the identity of the schema for data 40. The loader process 32 makes a determination whether the Describe information for Schema A already exists in the system, e.g., at cache 30. If not, then this information is acquired, e.g., by scanning, parsing, and analyzing the data 40 and placing the resulting information in cache 30 for subsequent data to load of the same schema type. If they do not yet exist, the appropriate load structures 26 are created for Schema A. If they already exist, then they are re-used to load data 44 through path 36 into database table(s) 24.

The next data 46 to load is another instance of Schema A. Since the schema information 30 and load structures 26 for Schema A already exist, the data can be loaded without incurring any additional costs to setup schema information or load structures.

The final data 48 to load is an instance of Schema B. As before, since the schema information 30 and load structures 28 for Schema B already exist, the data can be loaded without incurring any additional costs to setup schema information or load structures.

The cached schema information 30 or load structures 26, 28 and any associated resources can be released back to the system once they are no longer needed. Alternatively, they can be timed out and released if not used after a certain period of time or based upon a least recently used (LRU) approach.

It is noted that the present embodiment may be used to efficiently load data corresponding to multiple protocols. For example, in FIG. 1B, assume that data 40 is loaded from an FTP client while data 42 may be loaded from an HTTP client. The present approach is protocol neutral since it is keyed upon the schema of the data that is being loaded, and not upon the protocol of the client that is initiating the load process. Therefore, regardless of the protocol that is being used to load the data, the same cached metadata and load structures can be used to load data into the database. This allows clients of different protocol types to concurrently load data into the system without requiring multiple parallel structures to be created for the same schema, and therefore advantageously leverages the efficiency that is gained by amortizing the described preparatory procedure over multiple data loads as well as over multiple different protocol-based loads.

Array Columns Corresponding to Hidden Columns

Set forth in these sections is an embodiment of an approach for loading semistructured data into a database, such as certain XML-based data. In one embodiment, one or more routines associated with a particular type generates an array that contains separate columns for separate attributes of the particular type. The array may also contain one or more columns that correspond to hidden columns of a database table in which instances of the particular type are to be stored.

Figure 1C:
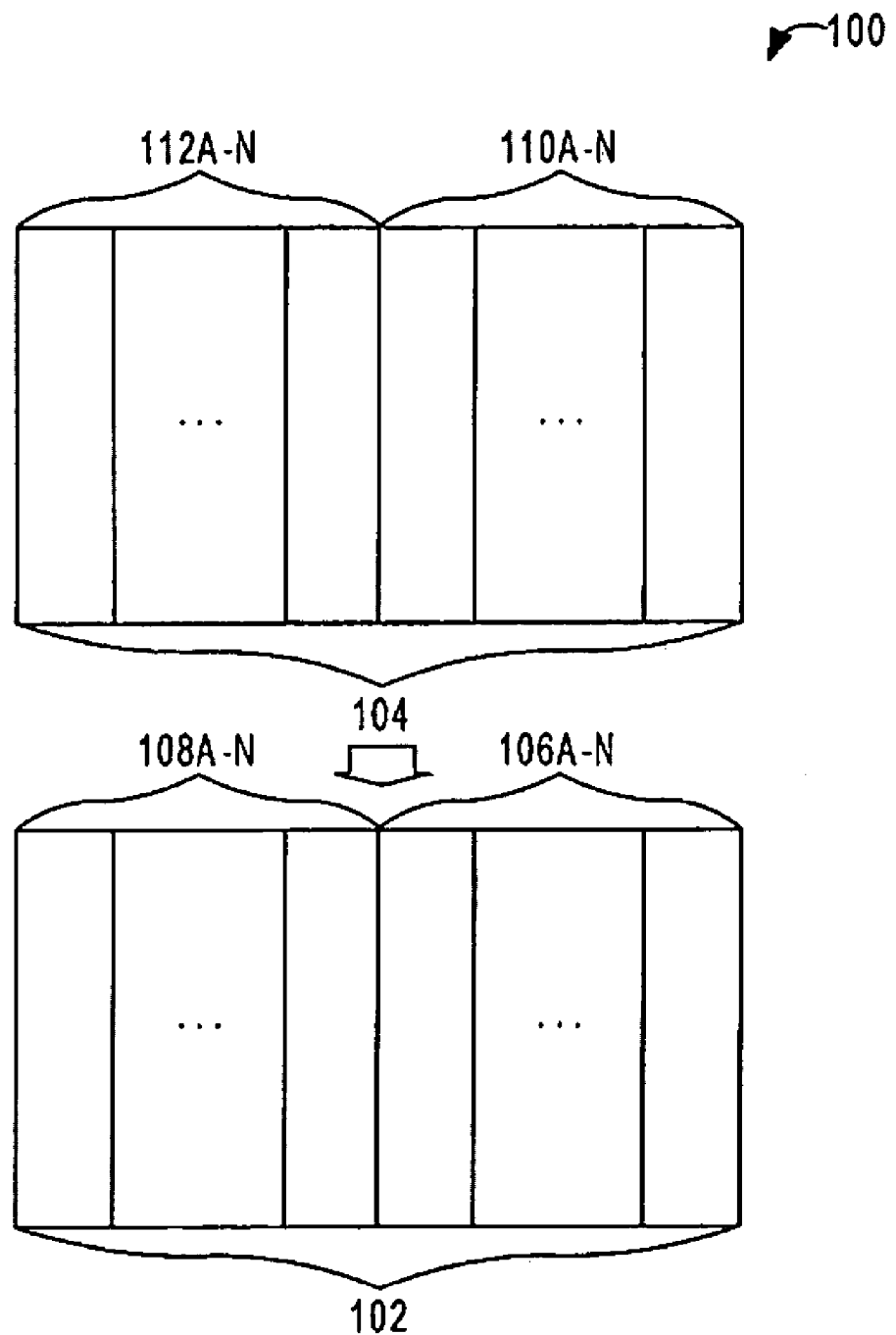
FIG. 1C is a block diagram that illustrates example structures that contain columns for storing values that are not to be displayed to a user.

FIG. 1C is a block diagram that illustrates example structures 100 that contain columns for storing values that are not to be displayed to a user. Structures 100 comprise a database table 102 and an array 104. Database table 102 comprises user-visible columns 106A–106N and hidden columns 108A–108N. User-visible columns 106A–106N correspond to attributes of a type whose instances are to be stored in database table 102.

Routines associated with a type whose instances are to be stored in database table 102 generate array 104. Array 104 comprises array columns 110A–110N and columns 112A–112N. Columns 110A–110N correspond to user-visible columns 106A–106N. Columns 112A–112N correspond to hidden columns 108A–108N.

The routines populate columns 110A–110N with values specified in semistructured data. The routines populate columns 112A–112N with additional values, which might not be specified in the semistructured data. For example, the routines may populate column 112A with instance identifiers that distinguish the instances stored in the rows of array 104, and the routines may populate column 112B with positional descriptors that indicate positions of such instances relative to each other within an original document.

When the routines generate data streams based on array 104, they do so based on the structure of columns 110A–110N and columns 112A–112N and all of the values stored therein. Therefore, when the data are written to a database, values that were stored in columns 110A–110N are stored in user-visible columns 106A–106N, and values that were stored in columns 112A–112N are stored in hidden columns 108A–108N.

Hidden columns are useful for storing information that is needed for re-creating an original document from which values were obtained, especially when that information cannot be derived from the values themselves. For example, such information may indicate some structural aspects of an original document. Because such information is typically used by a computer program and not by a human user, hidden columns are especially appropriate for storing such information.

While an embodiment of the invention is described with reference to arrays, alternative embodiments may use data structures other than arrays to perform the techniques described herein.

Out-of-Line Tables and Nested Tables

As is described above, a type may indicate multiple attributes, one or more of which may be of another type that indicates other attributes. A type of an attribute indicated by another type may be called a nested type. For example, if a type "A" indicates an attribute "X" that is of type "B," then "B" is called a nested type. The nested type and the type that indicates the attribute that is of the nested type may be called the child type and the parent type, respectively, relative to each other. In the above example, type "A" is a parent type relative to type "B," and type "B" is a child type relative to type "A."

Values within instances that conform to nested types may be stored in database tables in any of a variety of ways. Because values may be stored in database tables in a variety of ways, techniques for directly loading semistructured data into database tables should accommodate each of those ways.

For example, given a database table that contains multiple columns for multiple attributes of a parent type, multiple values corresponding to multiple attributes of a child type may be stored together within a single column of that database table as a large object (LOB). Internal delimiters within the LOB may delimit the values that correspond to the child type. When values corresponding to a child type are stored in this manner, the values are said to be stored "in-line."

Figure 2:
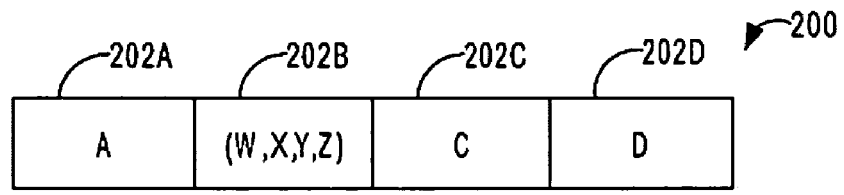
FIG. 2 is a block diagram that illustrates a row of a database table in which multiple values associated with an instance of a child type are stored in-line with values associated with an instance of a parent type.

FIG. 2 is a block diagram that illustrates a row of a database table 200 in which multiple values associated with an instance of a child type are stored in-line with values associated with an instance of a parent type. Values "A," "C," and "D," associated with the parent type, are stored in columns 202A, 202B, and 202D, respectively. Multiple values "(W, X, Y, Z)," associated with the child type, are stored in-line in column 202B as a LOB.

Alternatively, multiple values corresponding to multiple attributes of a child type may be stored in a database table that is separate from the database table that contains columns that correspond to attributes of the parent type. A column within the parent type's database table may store references to the child type's database table. Within the child type's database table, the values corresponding to the child type still may be stored in a single column as a LOB. When values corresponding to a child type are stored in this manner, the values are said to be stored "out-of-line."

Figure 3:
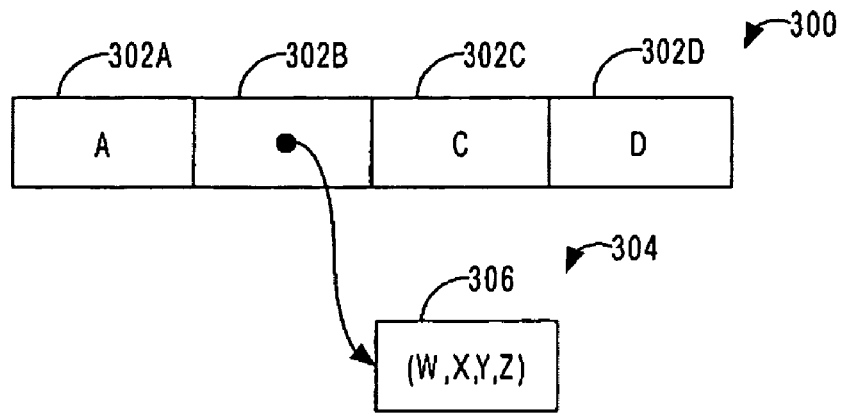
FIG. 3 is a block diagram that illustrates a row of a database table in which multiple values associated with an instance of a child type are stored out-of-line from a database table that stores values associated with an instance of a parent type.

FIG. 3 is a block diagram that illustrates a row of a database table 304 in which multiple values associated with an instance of a child type are stored out-of-line from a database table 300 that stores values associated with an instance of a parent type. Values "A," "C," and "D," associated with the parent type, are stored in columns 302A, 302B, and 302D, respectively. Column 302B stores a reference to column 306 of database table 304. Multiple values "(W, X, Y, Z)," associated with the child type, are stored out-of-line in column 306 as a LOB.

However, multiple values do not need to be stored as a LOB. Each of the multiple values may be stored in a separate row of a single column in the child type's database table. A first row of the column may store a first of the values, a second row of the column may store a second of the values, and so on. Sets of values within separate instances may be stored in separate sets of rows in the same column of the child type's database table. For example, values of a first instance of the child type may be stored in the first N rows of the column, values of a second instance of the child type may be stored in the next N rows of the column, and so on. When values corresponding to a child type are stored in this manner, the values are said to be stored in a "nested table."

Figure 4A:
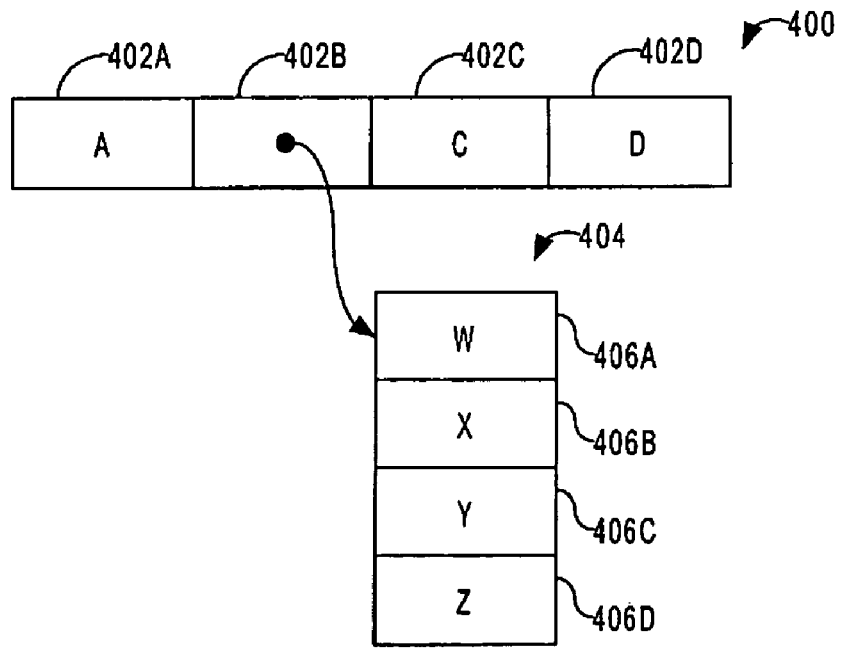
FIG. 4A is a block diagram that illustrates multiple rows of a nested database table in which multiple values associated with an instance of a child type are stored.

FIG. 4A is a block diagram that illustrates multiple rows of a nested database table 404 in which multiple values associated with an instance of a child type are stored. Values "A," "C," and "D," associated with the parent type, are stored in columns 402A, 402B, and 402D, respectively. Column 402B stores a reference to rows 406A–408D of database table 404. Values "W," "X," "Y," and "Z," associated with the child type, are stored in rows 406A–408D, respectively, of nested table 404. In this case, the values are stored in separate rows, and not as a LOB.

Figure 4B:
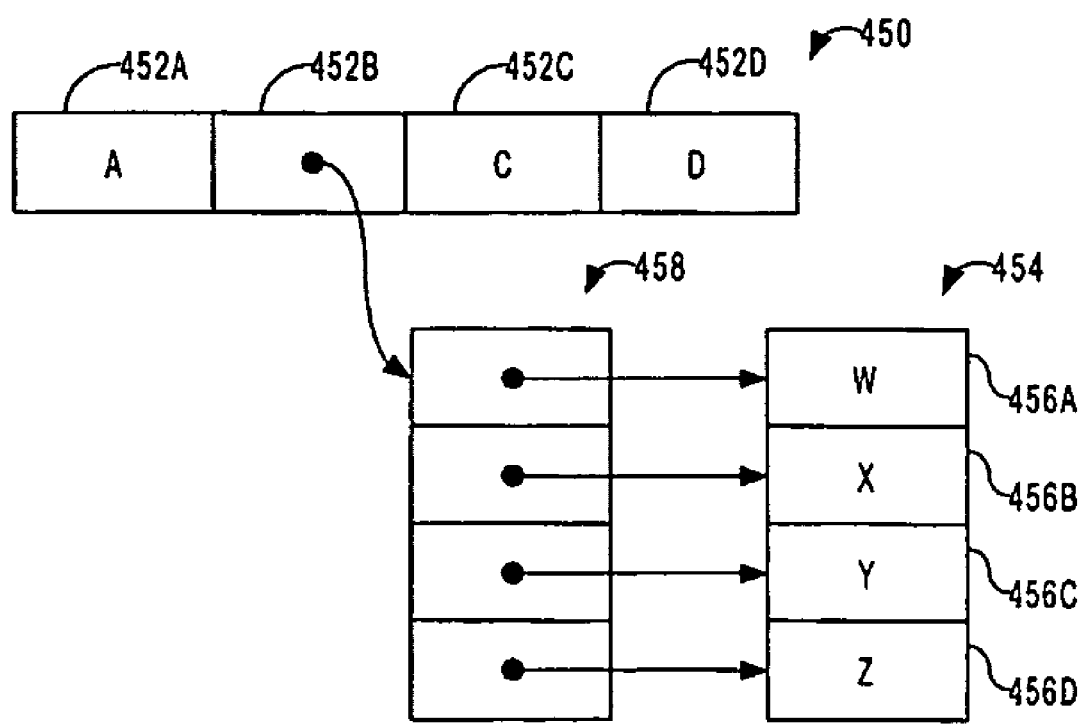
FIG. 4B is a block diagram that illustrates multiple rows of a nested database table in which multiple values associated with an instance of a child type are stored out-of-line.

FIG. 4B is a block diagram that illustrates multiple rows of a nested database table 454 in which multiple values associated with an instance of a child type are stored out-of-line. Values "A," "C," and "D," associated with the parent type, are stored in columns 452A, 452B, and 452D, respectively. Column 402B stores a reference to a table of pointers 458. Each row in table of pointers 458 contains a pointer that points to a separate row of database table 454. Values "W," "X," "Y," and "Z," associated with the child type, are stored in rows 456A–458D, respectively, of nested table 454. In this case also, the values are stored in separate rows, and not as a LOB.

To associate the multiple rows in the child type's database table with the single row in the parent type's database table, the corresponding rows from both database tables may be associated with a set identifier that distinguishes those associated rows from other associated rows in the database tables. For example, the first row in the parent type's database table and the first N rows in the child type's database table may be associated with a first unique set identifier, the second row in the parent type's database table and the second N rows in the child type's database table may be associated with a second unique set identifier, and so on.

There is no limitation on the levels of indirection that may be used when storing instances of nested types in nested tables. A nested type may indicate an attribute that is of another nested type. Thus, a row of a nested table may indicate a reference to another out-of-line database table or nested table.

Based on characteristics of the nested type, one way of storing instances of the nested type may be selected over other ways. A schema processor may make such a selection.

A nested table notably is useful for storing a collection that may be defined by an XML schema. Such a collection comprises zero or more instances of a type. The XML schema may indicate a minimum and/or maximum number of instances of the type that are to be contained in the collection. A nested table corresponding to such a collection may be created to comprise a number of rows equal to the maximum number of instances that will be in the collection.

Example System for Directly Loading Semistructured Data

Figure 5:
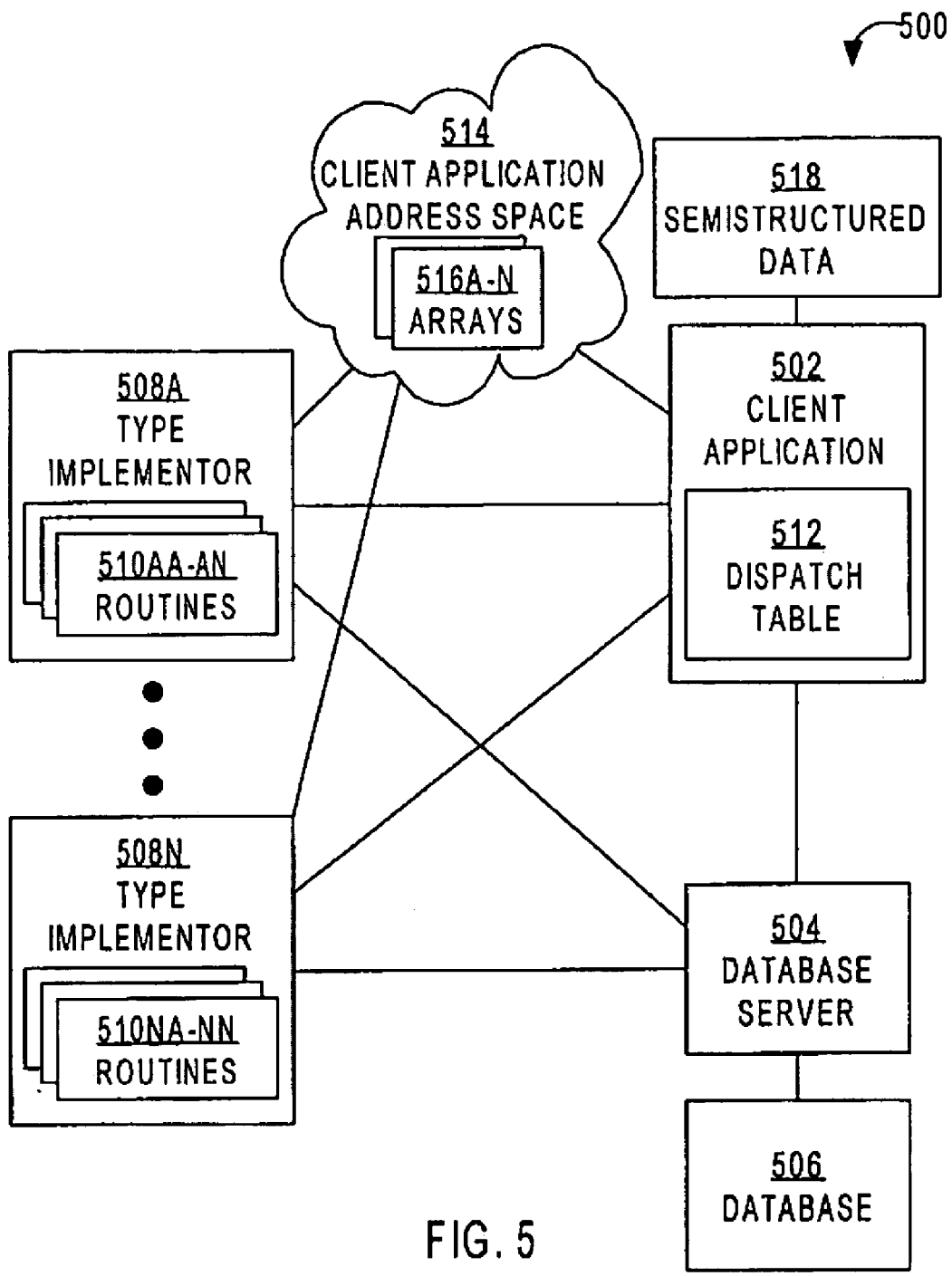
FIG. 5 is a block diagram that illustrates a system, according to an embodiment of the present invention, in which semistructured data may be stored in a database according to the direct path loading approach.

FIG. 5 is a block diagram that illustrates a system 500 in which semistructured data may be stored in a database according to the direct path loading approach, according to an embodiment of the present invention. System 500 comprises a client application 502, a database server 504, a database 506, and type implementors 508A–N. Client application 502, database server 504, and type implementors 508A–N are coupled communicatively to each other. Database server 504 is coupled communicatively to database 506. In the present example, client application 502 is loading the data, and can be any type of client entity, protocol, or process, such as for example, FTP, HTTP, datapump, or any suitable loader type.

Client application 502 reads or otherwise receives semistructured data 518 as input. Semistructured data 518 comprises instances of a type. For example, semistructured data 518 may comprise one or more XML instances that conform to an XML schema. Semistructured data 518 also comprises an identity of the type. For example, the type may be identified as an XML type. Semistructured data 518 does not indicate the structure of the type. The structure of the type is not defined to client application 502.

Based on semistructured data 518, client application 502 determines the identity of the type to which the instances conform. Client application consults dispatch table 512 to find, within the dispatch table, an entry that indicates the identity of the type. Dispatch table 512 comprises a separate entry for each of type implementors 508A–508N. Each entry indicates memory addresses of routines that are implemented by the type implementor that implements the type that is indicated by that entry. Table 1 below depicts an example of entries within a dispatch table.

TABLE 1

EXAMPLE DISPATCH TABLE ENTRIES

| TYPE IDENTITY | ADDRESSES OF ROUTINES |
| --- | --- |
| Identity of type implemented by type implementor 508A | Address of routine 510AA |
| . | . |
| . | Address of routine 510AN |
| . | . |
| . | . |
| Identity of type implemented by type implementor 508N | Address of routine 510NA |
| . | . |
| . | Address of routine 510NN |

The entries in dispatch table are added by client application 502 in response to type implementors 508A–N registering routines 510A–510NN with the client application. Each type implementor provides client application 502 with the information needed to add an entry for the type implemented by that type implementor. For example, type implementor 508A may load routines 510AA–AN into locations in memory, and then specify those locations to client application 502.

In response to finding, in dispatch table 512, an entry that indicates the identity of the type, client application 502 invokes the routines located at the memory addresses indicated by the entry. For example, if the type is implemented by type implementor 508A, then client application 502 invokes routines 510AA–510AN. If the type is an XML type, then client application 502 invokes routines that are associated with the XML type in the dispatch table.

One or more of the invoked routines creates an array 516A in client application address space 514. Client application address space 514 comprises a segment of memory allocated for use by client application 502. Array 516A comprises a separate column for each attribute of the type.

For example, an invoked routine may initialize a context for the type. Another invoked routine may indicate a number of columns in a database table that is to store instances of the type. For example, one implementation of an XML type maps to two top-level columns of a database table, in which one of the two top-level columns is a hidden column. The hidden column is for storing a positional descriptor, and the user-visible column is for storing a LOB or a reference to an out-of-line or nested table. Therefore, an invoked routine of the XML type implementor creates an array with two columns that correspond to the two top-level columns of the database table.

One or more of the invoked routines populates the columns of array 516A, including columns that correspond to hidden columns of a database table, with values. Some values may be specified in semistructured data 518, and other values may be derived from values specified in the semistructured data. Each value specified in semistructured data 518 corresponds to a separate attribute of the type.

Client application 502 may pass such values as parameters to one or more of the invoked routines. For example, for each instance specified within semistructured data 518, client application 502 may pass a single block of combined values, which represent that instance, as a parameter to one or more routines. The one or more routines may parse the block of combined values to produce separate values that correspond to the separate attributes of the type.

One or more of the invoked routines stores the values in corresponding columns of array 516A. Each row of array 516A stores values for a different instance specified in semistructured data 518. One of more the invoked routines returns, to client application 502, one or more pointers to one or more addresses within client application address space 514 at which one or more populated rows of array 516A can be found. Using the one or more pointers, client application 502 can locate and read the populated rows of array 516A.

One or more of the attributes of the type may be of a nested type that indicates one or more other attributes. For example, a parent type might indicate a first attribute that is of a scalar type, and a second attribute that is of a "purchase order" child type. The "purchase order" type also might indicate several attributes. In this case, the routines associated with the parent type invoke routines associated with the child type. The client application does not need to be aware of or invoke routines associated with the child type. When a routine is invoked to describe the structure of the parent type, that routine invokes another routine to describe the structure of the child type. When a routine is invoked to create an array for the parent type, that routine invokes another routine to create an array for the child type. When a routine is invoked to populate the array for the parent type, that routine invokes another routine to populate the array for the child type.

The number of columns in an array generated by a child type's implementor is based on the number of columns in a database table that is to store instances of the child type. If instances of a child type are stored in a nested table, then the array generated for the child type may contain one column that corresponds to the one column of the nested table, and each instance of the child type may be stored in a different row of the array column. Thus, multiple rows of a child array may correspond to a single row of a parent array. To preserve this correspondence, a set identifier is generated. The set identifier links the row of the parent array with the corresponding rows of the child array. The set identifier is stored in the parent array.

Each array may be populated independently of each other array. Arrays may be loaded and streamed asynchronously and independently.

Based on the populated rows of one or more arrays, the client application 502 generates a data stream. A data stream for one array may be generated independently of a data stream for another array. The data stream conforms to the format of data blocks within database 506. As a result, the data stream generated by client application 502 may be written directly to database 506 without causing the SQL engine to load each row of data. Client application 502 streams the data to database server 504. A stream generated based on one array may be sent to the database server independently of a stream generated based on another array. Database server 504 writes the data received from client application 502 directly into one or more data blocks in database 506. Values in array columns that correspond to hidden columns in database tables are stored in the corresponding hidden columns as a result of the writing.

Memory Management

Because the amount of memory available in client application address space 514 is limited, array 516A might not comprise enough rows to store, concurrently, values of all of the instances that are specified in semistructured data 518. Therefore, after a specified number of rows of array 516A have been populated, a data stream may be generated based on those populated rows, and the data may be streamed to database server 504. Then, the memory that the populated rows occupy may be freed. Once the memory has been freed, array 516A may be re-populated with values of additional instances for which a data stream has not yet been generated. This process may be repeated until data streams for all of the instances indicated in semistructured data 518 have been generated and streamed to database server 504.

Different arrays may be populated independently of each other. Different arrays may be associated with different database tables that comprise different numbers of rows. Values stored in such different arrays may be flushed to persistent storage at different times. Memory that stores one array may be freed before other memory that stores another array. For example, a parent array may be associated with a database table that comprises five rows, while a child array may be associated with a nested database table that comprises twenty-five rows. Rows in the child array may be populated, streamed to the database server, and re-populated multiple times before rows in the parent array are streamed to the database server once.

Managed Nested Types

Semistructured data 518 might comprise instances of a type "A" that comprises two attributes: an attribute "B" of a scalar type and an attribute "C" of a type "D" that is implemented by type implementor 508A. In turn, type "D" might comprise two attributes "E" and "F," both of scalar types.

In this example, the structure of type "A" is defined, at a high level, to client application 502. Client application 502 possesses sufficient information to generate, in client application address space 514, an array (array "A") to store instances of type "A". Array "A" comprises a column (column "B") for attribute "B" and a column (column "C") for attribute Client application 502 populates rows of array "A" on a per-instance basis. Because attribute "B" is of a scalar type, client application 502 may populate column "B" without invoking any external routines. Because attribute "C" is of a type implemented by type implementor 508A, client application 502 invokes one or more of routines 510AA–AN for each instance of type "A." For each instance, client application 502 passes a combined value block, which represents the value of attribute "C" for that instance, to the routines.

For each instance, the routines generate, in client application address space 514, columns (columns "E" and "F") corresponding to attributes "E" and "F" of type "D." For each instance, the routines populate columns "E" and "F" with corresponding values of attributes "E" and "F" separated out from the combined value block received as a parameter. For each instance, the routines return, to client application 502, a pointer to populated columns "E" and "F". Client application 502 stores the pointer in column "C" in the instance's corresponding row of array "A."

Client application 502 does not possess sufficient information about type "D" to free memory that stores instances of type "D." Therefore, when client application 502 is going to free memory that stores values for attribute "B," the client application also invokes one or more of routines 510AA–AN to free memory that stores the corresponding values for attributes "E" and "F."

When client application 502 is going to free memory that contains a pointer to columns "E" and "F", the client application passes the pointer as a parameter to one or more of routines 510AA–AN. Those routines then free the memory to which the pointer points. Client application 502 does not free the memory that stores the pointer until the client application invokes the routines that free the memory to which the pointer points.

Reference Counts

Multiple arrays may reference the same temporary data structure in memory. Such a data structure should be maintained in memory as long as at least one array is referencing the data structure. Only after no arrays are referencing a data structure should the memory that stores that data structure be freed for other purposes. Therefore, a separate reference count may be associated with each such temporary data structure in memory. When an array begins to make reference to a given data structure, then the reference count associated with that data structure is incremented. When an array no longer needs to make reference to a given data structure, then the reference count associated with that data structure is decremented. When a data structure's reference count is zero, then the memory that stores that data structure may be freed for other purposes.

Example Routines Implemented by a Type Implementor

Client application 502 may invoke different routines to perform different functions relative to a type. For example, each of routines 510AA–AN may perform a different function relative to a type implemented by type implementor 508. Such functions may include:

Allocating and initializing a general context block;
Indicating a type of a database table in which instances of the type are to be stored;
Indicating a number of columns in a database table in which instances of the type are to be stored;
Indicating types of columns in a database table in which instances of the type are to be stored;
Initializing a context for a database table in which instances of the type are to be stored;
Allocating memory, in client application address space 514, for one or more arrays to store values of instances of the type;
Parsing combined value blocks and storing separated values into separate columns of one or more arrays;
Freeing memory that stores values of an instance of a type;
Flushing existing populated memory structures to persistent storage;
Completing the direct path loading and freeing all memory that was allocated to perform the direct path loading; and
Aborting the direct path loading and freeing all memory that was allocated to perform the direct path loading.

Different routines may accept different parameters and return different results. Client application 502 may invoke one or more of routines 510AA–510AN sequentially in an order designed to achieve the ultimate goal of storing instances of the type in database 506 according to the direct path loading approach.

Error Management

Client application 502 may specify actions to be performed when an error occurs during the performance of any of the techniques described herein. For example, when such an error occurs, client application 502 may update an error counter value and determine whether the error counter value is greater than a specified threshold. Client application 502 may indicate that the techniques currently being performed should continue, despite the errors, unless the error counter value is greater than the specified threshold. Client application 502 may indicate that the techniques currently being performed, and techniques that will be performed thereafter, should be aborted if the error counter value is greater than the specified threshold.

It is desirable for routines 510AA–NN to handle errors in a way that is consistent with the way that client application 502 handles errors. Therefore, according to one embodiment, client application 502 passes memory addresses of error handling routines, which are implemented by the client application, to routines 510AA–NN. When any of routines 510AA–NN determines that an error has occurred, that routine executes an error handling routine that is located at the specified memory address. Thus, if an error handling condition is satisfied during the execution of any of routines 510AA–NN, actions connected to the satisfaction of the condition will be performed just as if the condition had been satisfied outside of the execution of such a routine.

Example Technique for Storing Semistructured Data in a Database According to the Direct Path Loading Approach FIGS. 6A–6D are flow diagrams that illustrate a technique 600, according to an embodiment of the present invention, for storing semistructured data in a database according to the direct path loading approach. Such semistructured data may comprise multiple different instances that conform to an XML schema.

In block 602, a "first" type implementor registers, with a client application, routines that are implemented by the first type implementor (the "first routines"). For example, type implementor 508A may register routines 510AA–AN with client application 502.

In block 604, the client application adds, to a dispatch table, an entry that indicates an association between the first routines and a parent type that the first type implementor implements. For example, client application 502 may add, to dispatch table 512, an entry that indicates an association between routines 510AA–AN and the type implemented by type implementor 508A. The parent type includes an attribute that is of a child type that is implemented by a "second" type implementor.

In block 606, the second type implementor registers, with the client application, routines that are implemented by the second type implementor (the "second routines"). For example, type implementor 508B may register routines 510BA–BN with client application 502.

In block 608, the client application adds, to the dispatch table, an entry that indicates an association between the second routines and the child type that the second type implementor implements. For example, client application 502 may add, to dispatch table 512, an entry that indicates an association between routines 510BA–BN and the type implemented by type implementor 508B.

In block 610, the client application receives semistructured data that specifies instances of the parent type. Each instance of the parent type specifies an instance of the child type. For example, client application 502 may read semistructured data 518, which may indicate (1) values of instances of the parent type and (2) the identity of the parent type.

In block 612, the client application determines, from the dispatch table, which routines are associated with the parent type. For example, client application 502 may determine, from dispatch table 512, that the parent type is associated with the first routines, routines 510AA–AN.

In block 614, the client invokes one or more of the first routines, which are associated with the parent type. For example, client application 502 may invoke routine 510AA to initialize a context block. Client application 502 may invoke routine 510AB to determine a type of a database table that will store instances of the parent type (the "parent database table"). Client application 502 may invoke routine 510AC to determine how many columns are in the parent database table. Client application 502 may invoke routine 510AD to determine the types of the columns in the parent database table.

In block 616, in response to its invocation, one or more of the first routines creates a "parent" array that comprises (1) a separate column for each attribute of the parent type and (2) columns that correspond to hidden columns of the parent database table. For example, when invoked, routine 510AE may create array 516A in client application address space 514. Array 516A might comprise two columns, one of which corresponds to a hidden column of a database table.

In block 622, one or more of the first routines invokes one or more of the second routines, which are associated with the child type. For example, routine 510AA may invoke routine 510BA to initialize a context block. Routine 510AB may invoke routine 510BB to determine a type of a database table that will store instances of the child type (the "child database table"). Routine 510AC may invoke routine 510BC to determine how many columns are in the child database table. Routine 510AD may invoke routine 510BD to determine the types of the columns in the child database table.

In block 624, in response to its invocation, one or more of the second routines creates a "child" array that comprises (1) a separate column for each attribute of the child type and (2) columns that correspond to hidden columns of the child database table. For example, when invoked, routine 510BE may create array 516B in client application address space 514. Array 516B might comprise five columns, two of which correspond to hidden columns of a database table.

Blocks 626–628 may be performed concurrently with blocks 630–632. In block 626, in response to its invocation, one or more of the first routines populates, with values of instances of the parent type, parent array columns that correspond to the attributes of the parent type. For example, when invoked, routine 510AF may populate one or more columns of array 516A with values of instances that are specified in semistructured data 518.

In block 628, in response to its invocation, one or more of the first routines populates, with other values, parent array columns that correspond to hidden columns of the parent database table. The other values might not be specified in the semistructured data, and might not be values that correspond to attributes of the parent type. However, the other values might be derived from the semistructured data. For example, when invoked, routine 510AF may populate some of the columns of array 516A with other values that are derived from semistructured data 518.

In block 630, in response to its invocation, one or more of the second routines populates, with values of instances of the child type, child array columns that correspond to the attributes of the child type. For example, when invoked, routine 510BF may populate one or more columns of array 516B with child type instance values that are specified in semistructured data 518.

In block 632, in response to its invocation, one or more of the second routines populates, with other values, child array columns that correspond to hidden columns of the child database table. The other values might not be specified in the semistructured data, and might not be values that correspond to attributes of the child type. However, the other values might be derived from the semistructured data. For example, when invoked, routine 510BF may populate some of the columns of array 516B with other values that are derived from semistructured data 518.

One or more set identifiers may be included among the values with which the parent and child arrays are populated. As described above, a set identifier associates a row in the parent array with a set of rows in a child array. Both the parent and child arrays may be generated with a column to store a set identifier.

In block 634, the client application generates a data stream based on the populated rows of one or more of the arrays. For example, based on populated arrays 516A and 516B, client application 502 may generate one or more data streams that conform to the format of data blocks stored in database 506.

In block 636, the client application streams the data to a database server 504. For example, client application 502 may stream data to database server 504.

In block 638, the database server writes the data directly into the database. For example, database server 504 may write data received from client application 502 directly into one or more data blocks in database 506. Values in array columns that correspond to hidden columns in database tables are stored in the corresponding hidden columns as a result of the writing.

Thus, semistructured data, such as instances of an XML schema, may be stored in a database according to the direct path loading approach. As is discussed above, the direct path loading approach is faster and consumes less memory than the conventional path loading approach. Using the techniques and systems described above, instances of an XML type may be stored in a database even after the XML type definition has been extended, without modifying either the client application or the database server.

System Architecture Overview

Figure 7:
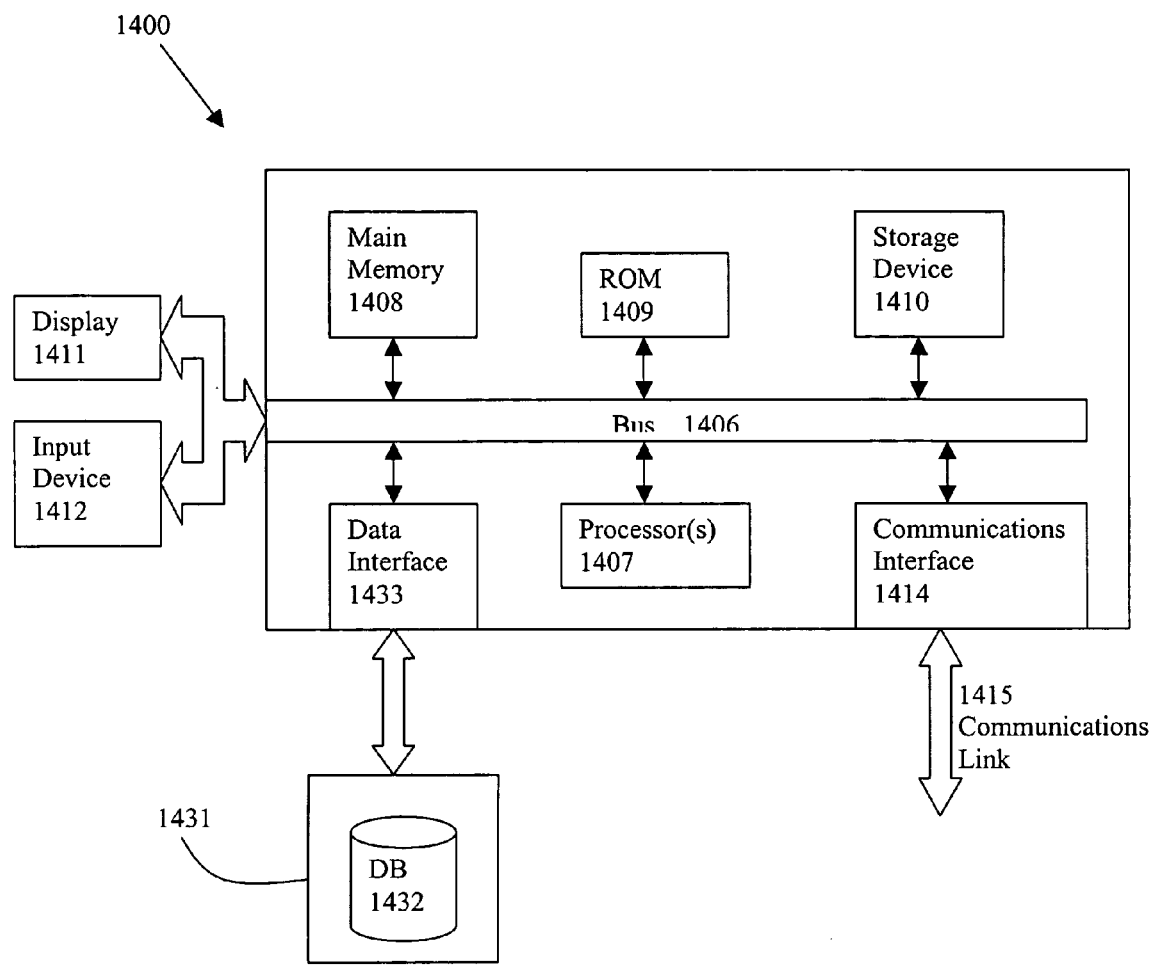
FIG. 7 is a block diagram that illustrates a computer system upon which an embodiment of the invention may be implemented.

The execution of the sequences of instructions required to practice the invention may be performed in embodiments of the invention by a computer system 1400 as shown in FIG. 7. As used herein, the term computer system 1400 is broadly used to describe any computing device that can store and independently run one or more programs. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

Each computer system 1400 may include a communication interface 1414 coupled to the bus 1406. The communication interface 1414 provides two-way communication between computer systems 1400. The communication interface 1414 of a respective computer system 1400 transmits and receives signals, e.g., electrical, electromagnetic or optical signals, that include data streams representing various types of information, e.g., instructions, messages and data. A communication link 1415 links one computer system 1400 with another computer system 1400. A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives signals, e.g., electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407. The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407. A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium" or "computer-readable medium" as used herein, refers to any medium that provides information or is usable by the processor(s) 1407. Such a medium may take many forms, including, but not limited to, non-volatile media and volatile media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A method of storing data into a database, comprising:
   identifying the data to load into the database, wherein the data is associated with a schema information;
   identifying the schema information for the data;
   determining whether the schema information and a schema-specific load structure that are used to load the data into the database already exist;
   acquiring the schema information from the data based on a first criteria, wherein the first criteria is associated with determining whether the schema information already exists;
   generating an in memory representation of the schema information to load the data into the database based on the first criteria;

generating the schema-specific load structure to load the data into the database based on a second criteria, wherein the second criteria is associated with determining whether the schema-specific load structure already exists; and storing the generated schema information and schema-specific load structures for subsequent loads of the data.

2. The method of claim 1 in which the schema-specific load structures comprise at least one of array column, data stream, dispatch table entry or allocated address space in memory.

3. The method of claim 1 in which the schema information comprises at least one of column type, column number or column identifier.

4. The method of claim 1 in which the schema information is protocol neutral.

5. The method of claim 1 in which the schema information can be used by multiple different protocol-based load procedures.

6. The method of claim 5 in which the multiple different protocol-based load procedures load data having different protocols, wherein the protocols comprise the File Transfer Protocol or the Hypertext Transfer Protocol.

7. The method of claim 1 in which the schema information is cached in memory.

8. The method of claim 1 in which the data is loaded using multiple streams of load operations.

9. The method of claim 8 in which the multiple streams are loaded in parallel.

10. The method of claim 1 further comprising:
receiving the data at a client application; and
storing the data according to a direct path approach.

11. The method of claim 10, the direct path approach further comprising:
creating a data structure; and
generating a data stream based on said data structure.

12. The method of claim 11, wherein said data structure is created in memory that is associated with said client application.

13. The method of claim 11, wherein the data structure comprises a database table and an array.

14. The method of claim 13, wherein the array comprises user visible columns and hidden columns.

15. The method of claim 10, wherein the data comprises semistructured data.

16. The method of claim 10, wherein the client application specifies actions to be performed when an error occurs.

17. The method of claim 10, wherein data are stored in the database without causing a Structured Query Language (SQL) engine to load the data.

18. The method of claim 1, further comprising storing data into the database using conventional path loading.

19. The method of claim 18, further comprising:
parsing data that comprises one or more instances of a type.

20. The method of claim 19, wherein the client application generates Structured Query Language (SQL) commands.

21. The method of claim 1 further comprising:
releasing resources associated with the schema information or load structure based on timed out information.

22. The method of claim 21, further comprising:
releasing resources associated with the schema information or load structure based upon a least recently used (LRU) approach.

23. A system for storing data into a database, comprising:
means for identifying the data to load into the database, wherein the data is associated with a schema information;
means for identifying the schema information for the data;
means for determining whether the schema information and a schema-specific load structure that are used to load the data into the database already exist, wherein the means for determining comprises a processor;
means for acquiring the schema information from the data based on a first criteria, wherein the first criteria is associated with the means for determining whether the schema information already exists;
means for generating an in memory representation of the schema information to load the data into the database based on the first criteria;
means for generating the schema-specific load structures to load the data into the database based on a second criteria, wherein the second criteria is associated with the means for determining whether the schema-specific load structure already exists; and
means for storing the generated schema information and schema-specific load structures for subsequent loads of the data.

24. A computer program product comprising a volatile or non-volatile computer storage medium having executable code to execute a process for storing data into a database, the process comprising:
identifying the data to load into the database, wherein the data is associated with a schema information;
identifying the schema information for the data;
determining whether the schema information and a schema-specific load structure that are used to load the data into the database already exist;
acquiring the schema information from the data based on a first criteria, wherein the first criteria is associated with determining whether the schema information already exists; and
generating an in memory representation of the schema information to load the data into the database based on the first criteria;
generating the schema-specific load structures to load the data into the database based on a second criteria, wherein the second criteria is associated with determining whether the schema-specific load structure already exits; and
storing the generated schema information and schema-specific load structures for subsequent loads of the data.

* * * * *

UNITED STATES PATENT AND TRADEMARK OFFICE
CERTIFICATE OF CORRECTION

PATENT NO. : 7,490,093 B2  Page 1 of 1
APPLICATION NO. : 10/718823
DATED : February 10, 2009
INVENTOR(S) : Jain et al.

It is certified that error appears in the above-identified patent and that said Letters Patent is hereby corrected as shown below:

Title Page;
On the face page, in field (73), in column 1, under "Assignee", line 2, before "Redwood" insert -- 500 Oracle Parkway --.

On the face page, in field (74), in column 2, under "Attorney, Agent, or Firm", line 1, delete "Bingham McCutchen LLP" and insert -- Vista IP Law Group, LLP --, therefor.

In column 1, line 43, delete "No" and insert -- No. --, therefor.

In column 5, line 36, after "quantity" delete ",".

In column 11, line 34, delete ""Y."" and insert -- "Y," --, therefor.

In column 14, line 63, delete "Managed" and insert -- Managing --, therefor.

In column 15, line 9, after "attribute" insert -- "C." --.

In column 22, line 53, in claim 24, delete "exits;" and insert -- exists; --, therefor.

Signed and Sealed this

Eighteenth Day of May, 2010

David J. Kappos
*Director of the United States Patent and Trademark Office*